United States Patent
Matsushita et al.

(10) Patent No.: US 12,508,251 B2
(45) Date of Patent: Dec. 30, 2025

(54) CD4 MIMIC COMPOUND WITH ANTI-HIV ACTIVITY

(71) Applicants: NATIONAL UNIVERSITY CORPORATION KUMAMOTO UNIVERSITY, Kumamoto (JP); NATIONAL UNIVERSITY CORPORATION TOKYO MEDICAL AND DENTAL UNIVERSITY, Tokyo (JP); JAPAN AS REPRESENTED BY DIRECTOR-GENERAL OF NATIONAL INSTITUTE OF INFECTIOUS DISEASES, Tokyo (JP)

(72) Inventors: Shuzo Matsushita, Kumamoto (JP); Kazuhisa Yoshimura, Kumamoto (JP); Hirokazu Tamamura, Tokyo (JP); Ami Masuda, Tokyo (JP); Kohei Takahashi, Tokyo (JP); Takuya Kobayakawa, Tokyo (JP); Shigeyoshi Harada, Tokyo (JP); Tomoyuki Miura, Kyoto (JP)

(73) Assignees: NATIONAL UNIVERSITY CORPORATION KUMAMOTO UNIVERSITY;, Kumamoto (JP); NATIONAL UNIVERSITY CORPORATION TOKYO MEDICAL AND DENTAL UNIVERSITY, Tokyo (JP); JAPAN AS REPRESENTED BY DIRECTOR-GENERAL OF NATIONAL INSTITUTE OF INFECTIOUS DISEASES, Tokyo (JP)

( * ) Notice: Subject to any disclaimer, the term of this patent is extended or adjusted under 35 U.S.C. 154(b) by 862 days.

(21) Appl. No.: 17/755,366

(22) PCT Filed: Oct. 29, 2020

(86) PCT No.: PCT/JP2020/040611
§ 371 (c)(1),
(2) Date: Apr. 27, 2022

(87) PCT Pub. No.: WO2021/085528
PCT Pub. Date: May 6, 2021

(65) Prior Publication Data
US 2022/0409594 A1 Dec. 29, 2022

(30) Foreign Application Priority Data
Oct. 29, 2019 (JP) ................. 2019-195967

(51) Int. Cl.
*A61K 31/438* (2006.01)
*A61K 39/42* (2006.01)
*C07D 221/20* (2006.01)

(52) U.S. Cl.
CPC ............ *A61K 31/438* (2013.01); *A61K 39/42* (2013.01); *C07D 221/20* (2013.01)

(58) Field of Classification Search
CPC .. A61K 31/438; A61K 31/4468; A61K 39/42; A61P 31/18; A61P 43/00; C07D 221/20
See application file for complete search history.

(56) References Cited

U.S. PATENT DOCUMENTS
2004/0062748 A1 4/2004 Martinez et al.

FOREIGN PATENT DOCUMENTS
JP 2006510601 A 3/2006
WO 2016190331 A1 12/2016

OTHER PUBLICATIONS

Kobayakawa et al., "Hybrids of Small-Molecule CD4 Mimics with Polyethylene Glycol Units as HIV Entry Inhibitors", Journal of Medicinal Chemistry, 2021, vol. 64, pp. 1481-1496.

(Continued)

*Primary Examiner* — Andrew D Kosar
(74) *Attorney, Agent, or Firm* — Lucas & Mercanti, LLP

(57) ABSTRACT

CD4 mimic compounds having improved efficacy for anti-HIV treatment and more improved pharmacokinetics are provided. The compounds are represented by formula (I):

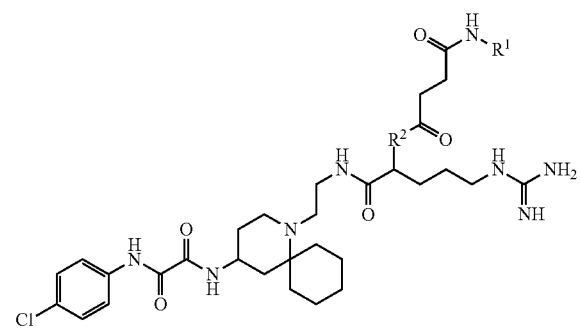

wherein $R^1$ is $C_2H_4(OC_2H_4)_n$—$OCH_3$ or $C_mH_{2m+1}$; $R^2$ is O or NH; n is 3 to 25; and m is 4 to 22, or a salt thereof. HIV infection inhibitor compositions including the compound or a salt thereof as an active ingredient are also disclosed.

10 Claims, 4 Drawing Sheets

(56) References Cited

OTHER PUBLICATIONS

Qian Z. et al., "Identification of N-phenyl-N'-(2,2,6,6-tetramethyl-piperidin-4-yl)-oxalamides as a new class of HIV-1 entry inhibitors that prevent gp120 binding to CD4", Virology, 2005, vol. 339, pp. 213-225.

Schon A. et al., "Thermodynamics of Binding of a Low-Molecular-Weight CD4 Mimetic to HIV-1 gp120", Biochemistry, 2006, vol. 45, pp. 10973-10980.

Madani N. et al., "Small-Molecule CD4 Mimics Interact with a Highly Conserved Pocket on HIV-1 gp120", Structure, 2008, vol. 16, pp. 1689-1701.

Hillel H et al., "Soluble CD4 and CD4-Mimetic Compounds Inhibit HIV-1 Infection by Induction of a Short-Lived Activated State", PLoS Pathogens, 2009, vol. 5, Issue 4, e1000360, pp. 1-13.

Yamada Y et al., "CD4 mimics targeting the mechanism of HIV entry", Bioorganic & Medicinal Chemistry Letters, 2010, vol. 20, pp. 354-358.

Narumi T et al., "Small molecular CD4 mimics as HIV entry inhibitors", Bioorganic & Medicinal Chemistry, 2011, vol. 19, pp. 6735-6742.

Nguyen W et al., "Structure-activity relationship exploration of Kv1.3 blockers based on diphenoxylate", Bioorganic & Medicinal Chemistry Letters, 2012, vol. 22, pp. 7106-7109.

Narumi T et al., "CD4 mimics as HIV entry inhibitors: Lead optimization studies of the aromatic substituents", Bioorganic & Medicinal Chemistry, 2013, vol. 21, pp. 2518-2526.

Ikeda Y, "PEGylation technology for the drug development", Drug Deliver System, 2016, vol. 31, No. 4, pp. 268-274.

International Search Report for Corresponding International Application No. PCT/JP2020/040611, 2 pages, Dec. 22, 2020.

Governa et al., "Recent research results have converted gp120 binders to a therapeutic option for the treatment of HIV-1 infection. A medicinal chemistry point of view", European Journal of Medicinal Chemistry, 2021, vol. 229, pp. 1-26.

Supplemental European Search Report for Corresponding European Patent Application No. 20882661.0, Nov. 17, 2023, 11 pages.

CD4 MIMIC COMPOUND WITH ANTI-HIV ACTIVITY

CROSS-REFERENCE TO RELATED APPLICATIONS

This application is a 371 of PCT/JP2020/040611, filed Oct. 29, 2020, which claims the benefit of Japanese Patent Application No. 2019-195967, filed Oct. 29, 2019.

TECHNICAL FIELD

The present invention relates to a novel CD4 mimic compound having an anti-HIV activity. More specifically, the present invention relates to a CD4 mimic compound having an improved pharmacokinetics.

BACKGROUND ART

Human immunodeficiency virus (HIV) is known as a virus causing acquired immunodeficiency syndrome (AIDS). There are three main infection routes of HIV: sexual contact, infection through blood transfusion or blood preparations and mother-to-child infection, and there is no risk of aerial infection. To date, about 74.9 million people have been infected with HIV in the world. Of them, 32 million people have died from AIDS-related illnesses. Currently, chemotherapy with drugs for suppressing AIDS has been successful, but permanent cure of AIDS has not yet been attained.

There are two types of HIV, HIV-1 and HIV-2. HIV-1 is further classified into subtypes A to K. HIV-1 is commonly seen in the Western Hemisphere, Europe, Asia, and Central/Southern/Eastern Africa, whereas, HIV-2 is common in Western Africa. Compared to HIV-1, which has many cases of infection, HIV-2 is less infectious and endemic regions are limited. Because of this, anti-HIV drugs and AIDS vaccines are mainly developed for HIV-1.

HIV-1 is one type of retrovirus. A matured HIV virus has a spherical shape of 100 to 110 nm in diameter and a cannonball-like core, which contains, e.g., two copies of single-stranded RNA genome, a reverse transcriptase and integrase, and is surrounded by an envelope structure formed of a lipid bilayer and outer coat proteins. On the surface of a viral particle, outer coat proteins, gp120 and gp41, are present in the form of a trimer. These proteins specifically bind to CD4, CXCR4 and CCR5 present on human CD4 positive T cells, i.e., helper T cells and macrophages, and play an important role in entry of HIV into host cells.

Anti-HIV drugs currently used in clinical settings are mostly enzyme inhibitors such as "reverse transcriptase inhibitor", "protease inhibitor" and "integrase inhibitor", which inhibit the action of HIV-specific enzyme. A multidrug therapy (anti-retroviral therapy (ART)) in which a plurality of drugs are administered in combination has been established, but inhibitors of HIV entry, which inhibits entry of HIV into cells, are not common. Only enfuvirtide serving as a membrane fusion inhibitor and maraviroc serving as a CCR5 inhibitor are clinically used. However, these drugs can suppress proliferation of virus but cannot completely kill virus. Accordingly, patients must take these drugs periodically over a lifetime, and the long-term administration causes problems: a risk of cumulative side effects and high treatment cost. Furthermore, HIV mutates easily and drug-resistant viruses emerge, which causes a serious problem, and development of vaccines against them is not easy.

In the process of entry of HIV-1 into a host cell, the first step starts from interaction between an HIV-1 outer coat protein gp120 and a host cell surface protein CD4 (first receptor). As a result of the interaction, the structure of gp120 significantly changes and a region called V3 loop is exposed. Then, V3 loop interacts with a secondary receptor (coreceptor, CCR5 or CXCR4), with the result that gp41 is exposed on the surface, passes through host-cell membrane, and then, membrane fusion takes place. In this way, HIV enters the host cell.

In 2005, through screening for compounds inhibiting syncytial formation of HIV-1, a low molecule compound NBD-556 having an action to inhibit entry of HIV virus was reported (Non Patent Literature 1). Since NBD-556 can bind to the interaction site with CD4, i.e., Phe43-cavity of gp120, to induce a structural change of gp120, NBD-556 also attracted attention as a low molecule CD4 mimic compound (Non Patent Literatures 2 to 4). However, NBD-556 has some problems: low anti-HIV activity, high cytotoxicity and low solubility in water. Then, structure-activity relationship study has been actively carried out using NBD-556 as a leading compound (Non Patent Literatures 5 to 8).

To date, the present inventors' group has modified the piperidine ring of NBD-556 to synthesize a compound HAR-171 having two cyclohexyl groups, and found that this compound has lower cytotoxicity and stronger anti-HIV activity than NBD-556 (Non Patent Literature 6). The group has also designed/synthesized various novel derivatives of NBD-556 having improved hydrophilicity to obtain monocyclohexyl compounds having a single cyclohexyl group introduced in the piperidine ring. As a result of evaluation for the anti-HIV activity, cytotoxicity and ability to induce a structural change of gp120, and estimation of interaction modes in accordance with docking simulation using integrated computational chemistry system, Molecular Operating Environment (MOE, Chemical Computing Group Inc.), compounds with excellent anti-HIV activity and low cytotoxicity can be obtained (Patent Literature 1). These compounds have been found to provide synergistic anti-HIV effect when used in combination with a neutralizing antibody specifically recognizing V3 loop exposed in the entry mechanism of HIV.

Of the compounds reported in Patent Literature 1, a CD4 mimic compound having significantly higher anti-HIV activity and greatly reduced cytotoxicity compared to NBD-556 is found to be $N^1$-(4-chlorophenyl)-$N^2$-(1-(2-(5-guanidinovaleramido)ethyl)-2-cyclohexylpiperidin-4-yl)oxalamide (referred herein to as YIR-821) having the following structure.

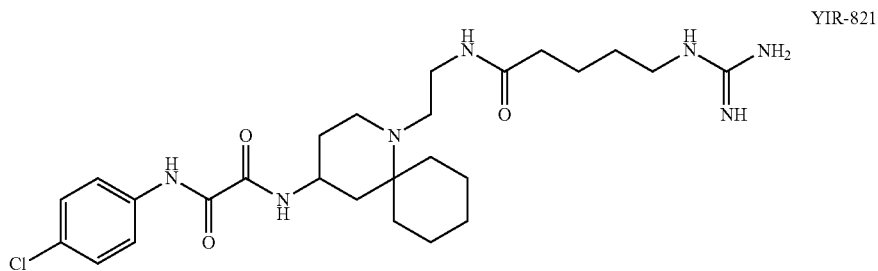 [SMILES: N=C(N)NCCCCC(=O)NCCN1CCC(NC(=O)C(=O)Nc2ccc(Cl)cc2)CC12CCCCC2]

YIR-821

CITATION LIST

Patent Literature

Patent Literature 1: International Publication No. WO2016/190331

Non Patent Literatures

Non Patent Literature 1: Qian, Z. et al., Virology 339, 213-225 (2005)
Non Patent Literature 2: Schon, A. et al., Biochemistry 45, 10973-10980 (2006)
Non Patent Literature 3: Madani, N. et al., Structure 16, 1689-1701 (2008)
Non Patent Literature 4: Hillel, H. et al., Plos Pathogens 5, e1000360 (2009)
Non Patent Literature 5: Yamada, Y. et al., Bioorg. Med. Chem. Lett. 20, 354-358 (2010)
Non Patent Literature 6: Narumi, T. et al., Bioorg. Med. Chem. 19, 6735-6742 (2011)
Non Patent Literature 7: Nguyen, W. et al., Bioorg. Med. Chem. Left. 22, 7106-7109 (2012)
Non Patent Literature 8: Narumi, T. et al., Bioorg. Med. Chem. 21, 2518-2526 (2013)

SUMMARY OF INVENTION

Technical Problem

As described above, the present inventors have reported CD4 mimic compounds having high anti-HIV activity simultaneously with low cytotoxicity, and bringing synergistic anti-HIV activity when used in combination with a neutralizing antibody. They have further conducted studies on structure-activity relationship for obtaining a compound having a further improved pharmacokinetics.

Solution to Problem

In order to attain the above object, the present inventors synthesized various derivatives from a parent compound YIR-821 and conducted studies. As a result, they succeeded in obtaining a novel CD4 mimic compound having an extremely longer half-life in vitro and in vivo than YIR-821, in other words, being effective for a long time, by adding a PEG chain or an alkyl chain to YIR-821 as a side chain. Based on the success, the present invention was accomplished.

More specifically, the present invention provides the followings.

1. A compound represented by the following formula (I):

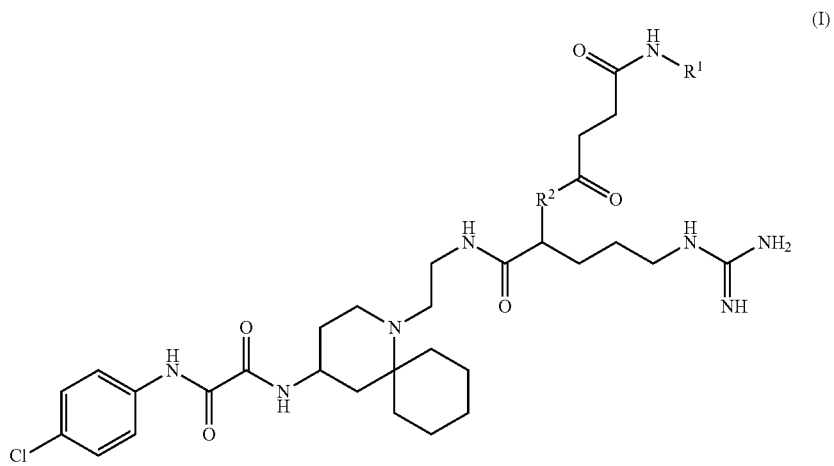

wherein $R^1$ represents $C_2H_4(OC_2H_4)_n$—$OCH_3$, or $C_mH_{2m+1}$; $R^2$ represents O or NH; n is 3 to 25; and m is 4 to 22,
or a salt thereof.

2. The compound or a salt thereof according to 1, represented by the following formula:

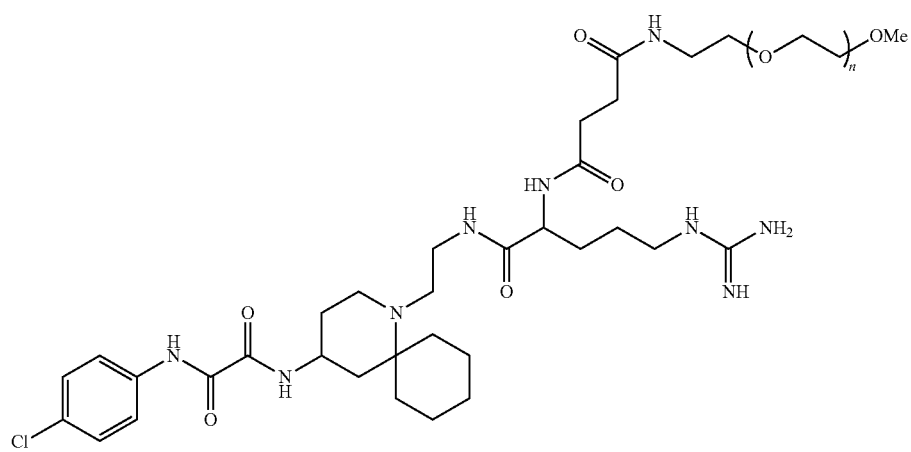

wherein n is 3 to 25.

3. The compound or a salt thereof according to 2, wherein n is 4 to 23.
4. An HIV infection inhibitor comprising the compound or a salt thereof according to any one of 1 to 3, as an active ingredient.
5. A pharmaceutical composition for treating or preventing HIV infection, comprising the HIV infection inhibitor according to 4.
6. The HIV infection inhibitor according to 4 or the pharmaceutical composition according to 5, which is administered in combination with an anti-HIV antibody.
7. The HIV infection inhibitor or the pharmaceutical composition according to 6, wherein the anti-HIV antibody is a neutralizing antibody specific to V3 loop on a surface of HIV-1.

The specification incorporates the disclosure of JP Patent Application No. 2019-195967, which is the basis for the priority of this application.

Advantageous Effects of Invention

The present invention provides a CD4 mimic compound having high anti-HIV activity with low cytotoxicity and significantly extended half-life, and a novel HIV infection inhibitor comprising the CD4 mimic compound as an active ingredient.

DESCRIPTION OF EMBODIMENTS

Figure 1:
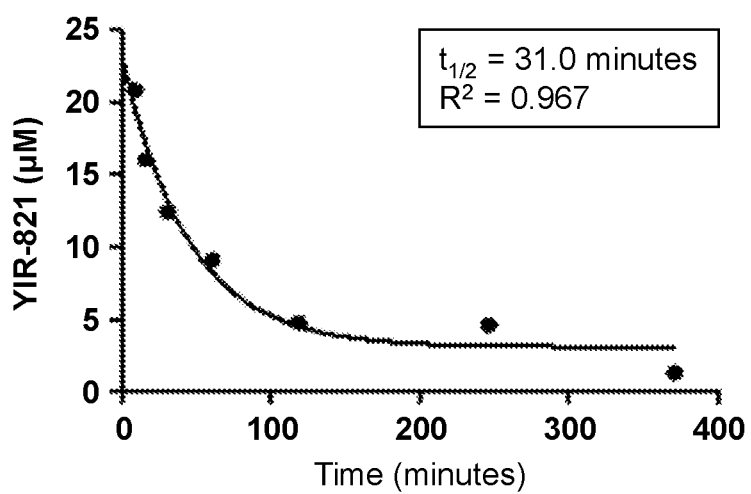
FIG. 1 shows a change in blood concentration of YIR-821 after administration by intravenous injection.

The present invention is more specifically described, below.

As described above, the present invention provides a compound represented by the following formula (I):

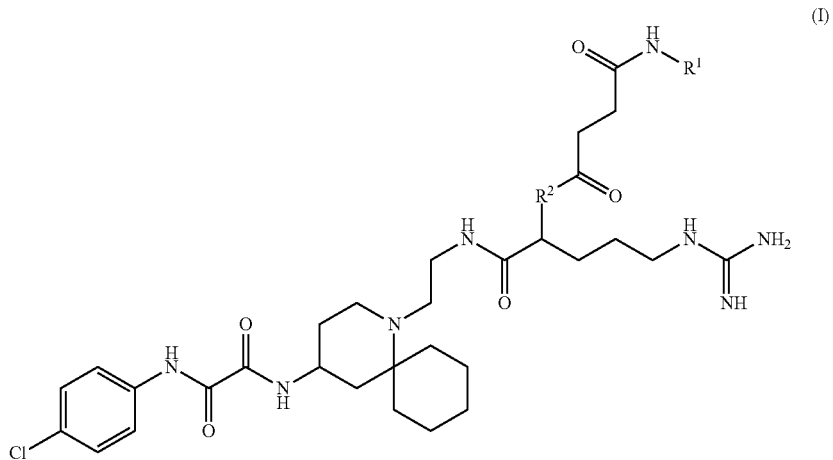

(I)

wherein $R^1$ represents $C_2H_4(OC_2H_4)_n$—$OCH_3$, or $C_mH_{2m+1}$; $R^2$ represents O or NH; n is 3 to 25; and m is 4 to 22,
or a salt thereof.

The compound shown above is a YIR-821 derivative having a PEG chain or an alkyl chain in the side chain of YIR-821. In order to obtain a CD4 mimic compound having suitable activity, low toxicity and suitable solubility, it is necessary that the length of the PEG chain or the alkyl chain falls within a certain range. Accordingly, in a derivative having a PEG chain in the above formula, n may fall within the range of 3 to 25, for example, 4 to 23, 3 to 7, 3 to 5, 9 to 13, 10 to 12, 21 to 25 or 22 to 24. In a derivative having an alkyl chain, m preferably falls within the range of 4 to 22, and more specifically, m may be 5 to 21, 6 to 20, 7 to 19 or 8 to 18.

In an embodiment, the compound of the present invention has a PEG chain, and is represented by the formula (I) wherein $R^1$ is $C_2H_4(OC_2H_4)_n$—$OCH_3$ and $R^2$ is NH. The compound of this embodiment is represented by the following formula, and decomposition reaction releasing the PEG chain rarely occurs, with the result that a longer half-life can be brought.

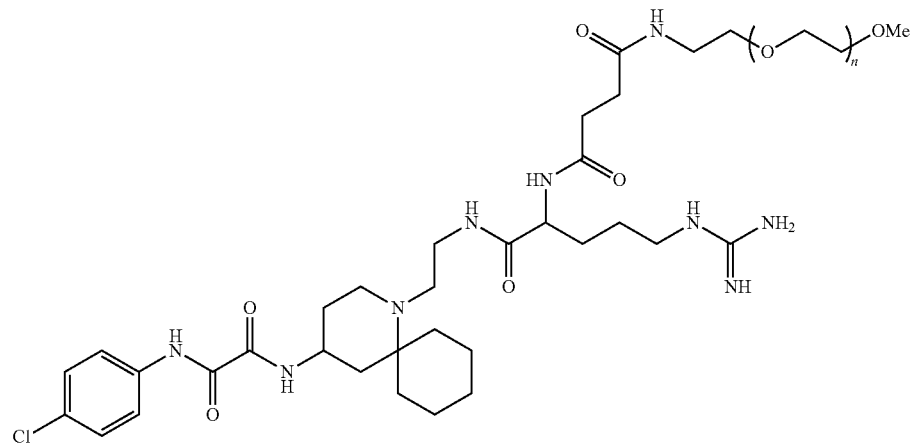

[n is 3 to 25.]

In another embodiment, the compound of the present invention has a PEG chain, and is represented by the formula (I) wherein $R^1$ is $C_2H_4(OC_2H_4)_n$—$OCH_3$ and $R^2$ is O. The compound of this embodiment is represented by the following formula, and a reaction releasing the PEG chain by hydrolysis of —C(=O)O— group can occur relatively early.

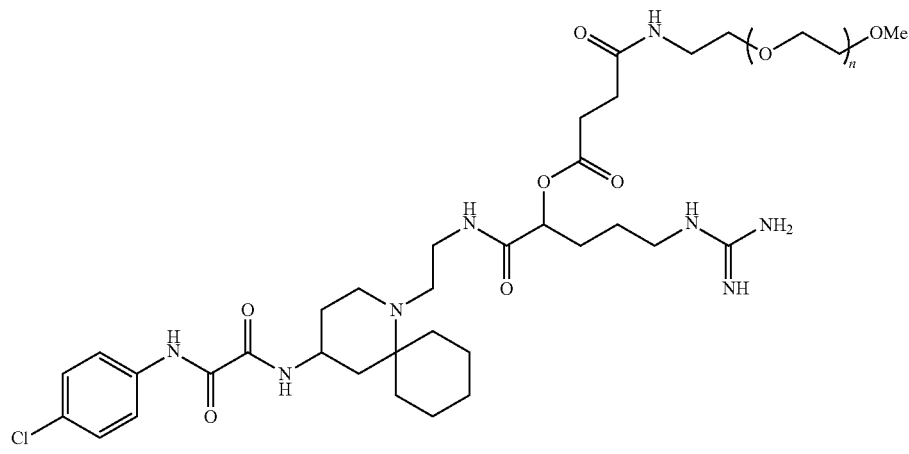

[n is 3 to 25.]

In an embodiment, the compound of the present invention has an alkyl chain, and is represented by the formula (I) wherein $R^1$ is $C_mH_{2m+1}$ and $R^2$ is NH. The compound of this embodiment is represented by the following formula, and a decomposition reaction releasing the alkyl chain rarely occurs, with the result that a longer half-life can be brought.

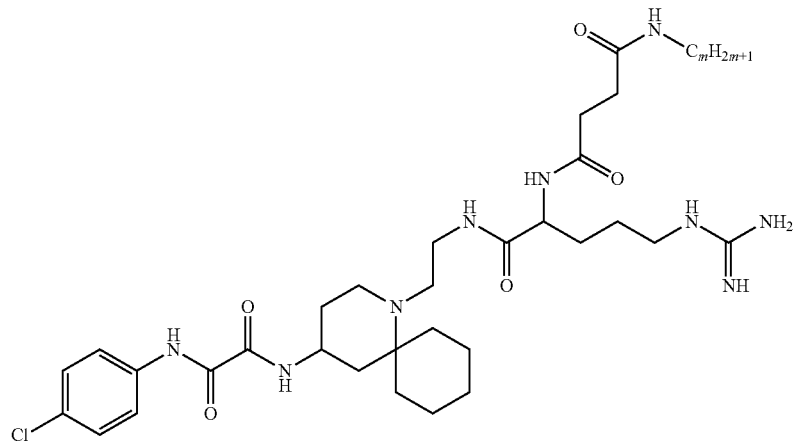

[m is 4 to 22.]

In another embodiment, the compound of the present invention has an alkyl chain, and is represented by the formula (I) wherein $R^1$ is $C_mH_{2m+1}$ and $R^2$ is O. The compound of this embodiment is represented by the following formula, and a reaction releasing the alkyl chain by hydrolysis of —C(=O)O— group can occur relatively early.

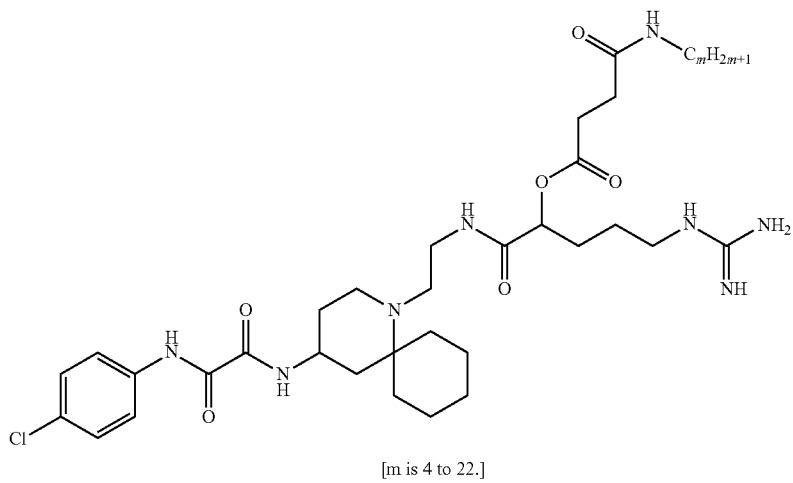

[m is 4 to 22.]

In a preferred aspect of the present invention, the compound of the present invention has the following structure, represented by the formula (I) wherein $R^1$ is $C_2H_4(OC_2H_4)_n$—$OCH_3$; $R^2$ is NH and n is 4. The following compound is herein designated as TKB-001.

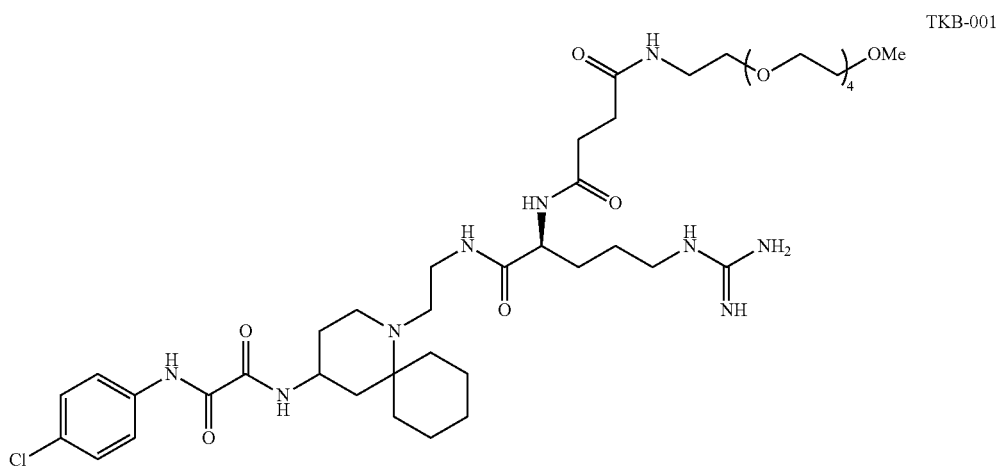

TKB-001

In another preferred aspect of the present invention, the compound of the present invention has the following structure, represented by the formula (I) wherein $R^1$ is $C_2H_4(OC_2H_4)_n$—$OCH_3$; $R^2$ is NH and n is 11. The following compound is herein designated as TKB-002. It has been found that TKB-002 has a blood half-life 3.48 times longer than YIR-821, as shown in Examples, and is stable even in the presence of human liver microsomes.

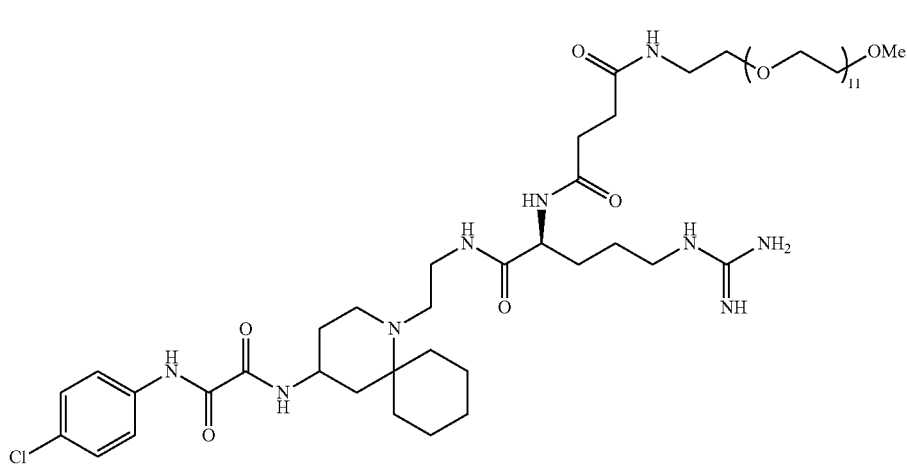

TKB-002

In a further preferred aspect of the present invention, the compound of the present invention has the following structure, represented by the formula (I) wherein $R^1$ is $C_2H_4(OC_2H_4)_n$—$OCH_3$; $R^2$ is NH and n is 23. The following compound is herein designated as TKB-003.

inhibit the binding between Phe43-cavity of HIV gp120 and CD4. Although not bound by any theory, the structural change of gp120 caused by the compound of the present invention or a salt thereof, which is not the same change as that caused by interaction with CD4, exposes V3 loop but

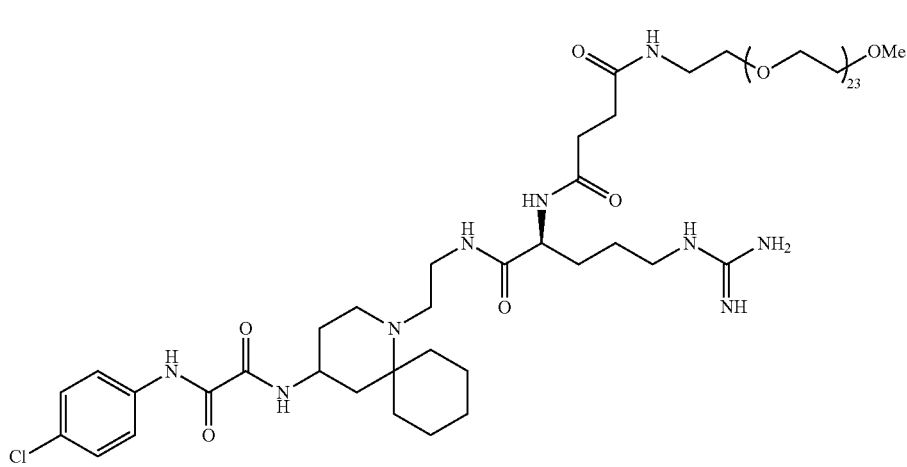

TKB-003

The compounds of the present invention can be synthesized by synthetic pathway starting from a parent compound YIR-821 in accordance with the descriptions in the specification of the present application and by use of techniques commonly used in this field, though the synthetic method is not particularly limited. The synthesis of YIR-821 can be carried out based on the descriptions in, for example, International Publication No. WO2016/190331, but the method is not particularly limited.

The compound of the present invention can form a salt with an inorganic or organic base at either one or both of a nitrogen atom in a piperidine ring and a nitrogen atom in a guanidino group. The salts are not particularly limited but pharmaceutically acceptable salts are preferable; for example, a hydrochloride, a sulfate, a phosphate, a succinate, a fumarate, a mesylate, a tosylate, a hydrobromide, an acetate and a trifluoroacetate can be preferably used.

The compound of the present invention or a salt thereof serves as a CD4 mimic compound and can competitively does not allow binding to a coreceptor usually subsequently takes place, with the result that entry of HIV into host cells can be inhibited. Accordingly, the present invention provides an HIV infection inhibitor comprising the compound of the present invention or a salt thereof as mentioned above, as an active ingredient.

The compound of the present invention or a salt thereof can be administered by itself as an HIV infection inhibitor, or can be administered as a pharmaceutical composition produced by appropriately adding, to the active ingredient, a carrier, an excipient, a preservative or an oxidation stabilizer, commonly used in pharmaceutical compositions. Accordingly, the present invention provides a pharmaceutical composition for treating or preventing HIV infection, comprising the HIV infection inhibitor.

The HIV infection inhibitor and the pharmaceutical composition of the present invention can be orally and parenterally administered. Examples of administration include, but are not particularly limited to, administration perorally;

and intravenous, intramuscular, percutaneous, subcutaneous, intradermal and intraperitoneal administration by injection or infusion. The route of administration can be preferably intravenous, intramuscular or subcutaneous injection. A suitable administration route for the HIV infection inhibitor and the pharmaceutical composition of the present invention can be appropriately determined by those skilled in the art.

The dosage of the HIV infection inhibitor of the present invention to humans varies depending on e.g., age, body weight and symptoms of the patient to be administered, but is not particularly limited. The dosage per day may fall within the range of, for example, 100 µg/kg body weight to 100 mg/kg body weight, preferably 500 µg/kg body weight to 50 mg/kg body weight, and more preferably, 1 mg/kg to 30 mg/kg body weight.

The HIV infection inhibitor of the present invention can be used alone, or intended to be used in combination with another type of anti-HIV drug having an inhibitory action based on different mechanism. Examples of the other anti-HIV drug, include, but are not particularly limited to, a reverse transcriptase inhibitor, a protease inhibitor and an integrase inhibitor. Examples of the reverse transcriptase inhibitor include, but are not limited to, zidovudine, lamivudine, abacavir, tenofovir, emtricitabine and efavirenz. Examples of the protease inhibitor include, but are not limited to, atazanavir, darunavir and ritonavir. Examples of the integrase inhibitors include, but are not limited to, raltegravir. The HIV infection inhibitor and another type of anti-HIV drug can be formulated in the same or different pharmaceutical compositions. The HIV infection inhibitor of the present invention and another type of anti-HIV drug can be administered simultaneously, sequentially or completely separately. The administration routes of the HIV infection inhibitor of the present invention and another type of anti-HIV drug may be the same or different.

The HIV infection inhibitor of the present invention is intended to be used in combination with an antibody specific to HIV. The antibody is not particularly limited, however, a neutralizing antibody, particularly a neutralizing monoclonal antibody specific to V3 loop of HIV or a functional fragment thereof is preferably used, because the HIV infection inhibitor of the present invention binds to HIV to induce a structural change of gp120 and exposes V3 loop.

Various research and developments on anti-HIV monoclonal antibodies have been carried out in the field. A typical monoclonal antibody against V3 loop of HIV can be KD-247 (suvizumab) currently under clinical trial. Details of anti-HIV monoclonal antibodies are described, for example, in Journal of Virology, June 2006, p. 5552-5562; Journal of Virology, June 2006, p. 5563-5570; the Chemo-Sero-Therapeutic Research Institute, Reimei, 23: 42-54 (2014); JP Patent No. 2989862 and JP Patent No. 5526386. The amino acid sequences of VH and VL regions of KD-247 are disclosed in Journal of Virology, June 2006, p. 5552-5562. KD-247 antibody and another type of anti-HIV antibody can be obtained by those skilled in the art, based on the above information.

Accordingly, the present invention provides an HIV infection inhibitor or a pharmaceutical composition as mentioned above characterized by being administered in combination with an anti-HIV antibody. In a preferred embodiment, the anti-HIV antibody is a neutralizing antibody specific to V3 loop on the surface of HIV-1, but the anti-HIV antibody is not limited to this.

The HIV infection inhibitor of the present invention and an anti-HIV antibody may be administered simultaneously, sequentially or completely separately. The administration routes of the HIV infection inhibitor of the present invention and an anti-HIV antibody may be the same or different.

EXAMPLES

The present invention is more specifically described by way of Examples, but the present invention is not limited by Examples.

Reference Example 1: Measurement of Blood Half-Life of YIR-821

A Macaque monkey (MM616, body weight 8.00 kg) was intravenously injected with YIR-821 at a dose of 192 mg (10.1 mg/mL). A blood sample was taken from the monkey, 21, 39, 63, 91, 98, 113, 143, 201, 328 and 453 minutes later, and the concentration of YIR-821 in the blood was measured by HPLC.

HPLC conditions are as follows.
Measuring device: JASCO PU-2089 plus (JASCO Corporation, Ltd.)
Column: Cosmosil $5C_{18}$-ARII column (4.6×250 mm, Nacalai Tesque, Inc.)
Solvent A: $H_2O$ containing 0.1% (v/v) TFA
Solvent B: $CH_3CN$ containing 0.1% (v/v) TFA
Gradient: 20-50% solvent B in solvent A, 30 minutes
Flow rate: 1 $cm^3$/min
Detection: Detection at 260 nm-UV As a result, the concentration of YIR-821 in blood changes as shown in FIG. 1 and the half-life in blood was calculated as 31.0 minutes.

Example 1: Synthesis of Compound of the Present Invention 1

Compounds of the present invention having a PEG chain were synthesized in accordance with the steps in the following synthesis scheme.

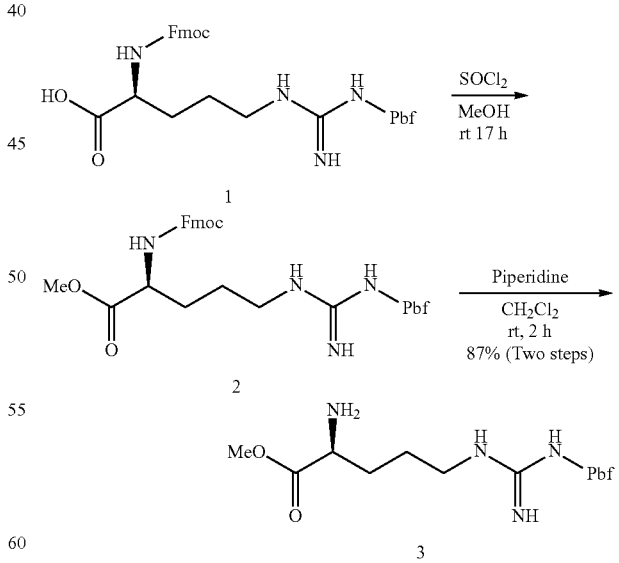

To a MeOH (67 mL) solution of Compound 1 (13.0 g, 20.0 mmol), $SOCl_2$ (1.6 mL, 22 mmol) was added at 0° C. After stirring at room temperature for 17 hours, the reaction mixture was concentrated under reduced pressure to obtain a crude mixture as a white powder. To the crude mixture in CH$_2$Cl$_2$ (219 mL), piperidine (9.32 g, 109.5 mmol) was added. The reaction mixture was stirred at room temperature for two hours and purified by silica gel column chromatography (CHCl$_3$/MeOH=10/1) to obtain Compound 3 (methyl N$^\omega$-((2,2,4,6,7-pentamethyl-2,3-dihydrobenzofuran-5-yl)sulfonyl)-L-arginate), as a white powder (7.61 g, yield 87%).

$^1$H NMR (500 MHz, CDCl$_3$) δ 1.45 (s, 6H), 1.59-1.66 (m, 2H), 1.79-1.82 (m, 1H), 1.87 (s, 3H), 2.09 (s, 3H), 2.51 (s, 3H), 2.57 (s, 3H), 2.95 (s, 2H), 3.16-3.21 (m, 2H), 3.48-3.51 (m, 1H), 3.69 (s, 3H), 6.22 (br, 2H), 6.31 (br, 1H); $^{13}$C NMR (500 MHz, CDCl$_3$) δ 12.6, 18.1, 19.4, 25.9, 28.8, 31.5, 41.1, 43.5, 51.0, 52.4, 54.1, 86.6, 117.7, 124.8, 132.5, 133.3, 138.6, 156.4, 159.0, 176.1; [α]$_D$=+4.90 (c 1.02, CHCl$_3$); HRMS (ESI), C$_{20}$H$_{33}$N$_4$O$_5$S$^+$ [M+H]$^+$ m/z: calculated: 441.2166, found: 441.2165.

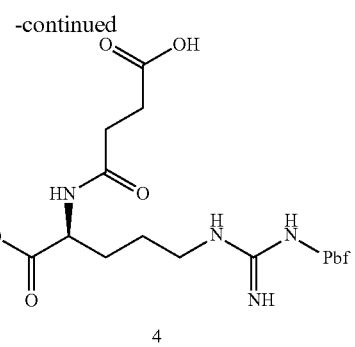

To a CH$_2$Cl$_2$ (155 mL) solution of Compound 3 (6.81 g, 15.5 mmol), succinic anhydride (1.64 g, 16.3 mmol) and Et$_3$N (2.38 mL, 17.1 mol) were added at room temperature. After stirring at room temperature for 17 hours, the reaction mixture was concentrated under reduced pressure and purified by silica gel column chromatography (CHCl$_3$/MeOH=5/1) to obtain Compound 4 ((S)-4-((1-methoxy-1-oxo-5-(3-((2,2,4,6,7-pentamethyl-2,3-dihydrobenzofuran-5-yl)sulfonyl)guanidino)pentane-2-yl)amino)-4-oxobutanoic acid), as a white powder (5.04 g, 9.32 mmol, yield 60%).

$^1$H NMR (400 MHz, CDCl$_3$) δ 1.46 (s, 7H), 1.58 (b, 2H), 1.68-1.75 (m, 1H), 1.89-1.91 (m, 1H), 2.09 (s, 3H), 2.44-2.48 (m, 4H), 2.55-2.66 (m, 6H), 2.78-2.85 (m, 1H), 2.95 (s, 2H), 3.18 (b, 2H), 3.73 (s, 3H), 4.60 (b, 1H), 6.36 (b, 2H), 6.91 (b, 1H); $^{13}$C NMR (500 MHz, CDCl$_3$) δ 12.8, 18.2, 19.6, 25.1, 28.9, 29.8, 31.0, 41.0 (2C), 43.5, 52.0, 52.1, 52.2, 53.0, 86.9, 118.0, 125.1, 132.9, 138.9, 156.6, 159.4, 172.8, 173.1, 176.5; [α]$_D$=+22.7 (c 1.02, CHCl$_3$); HRMS (ESI), C$_{24}$H$_{35}$N$_4$O$_8$S$^-$ [M–H]$^-$ m/z: calculated: 539.2181, found: 539.2179.

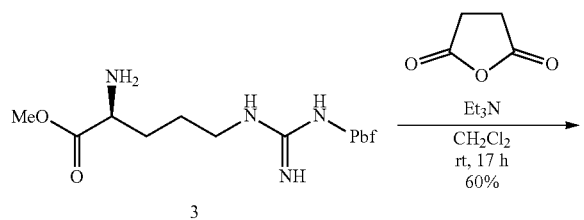

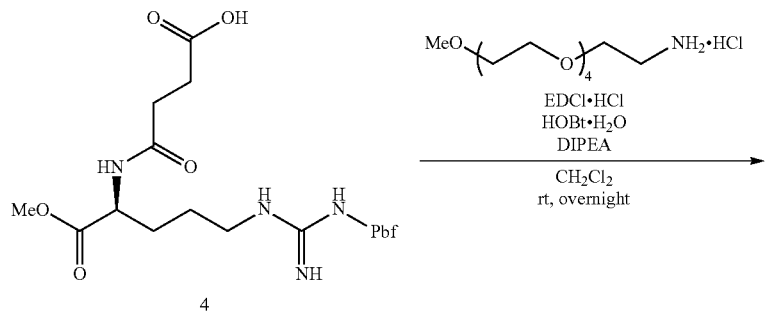

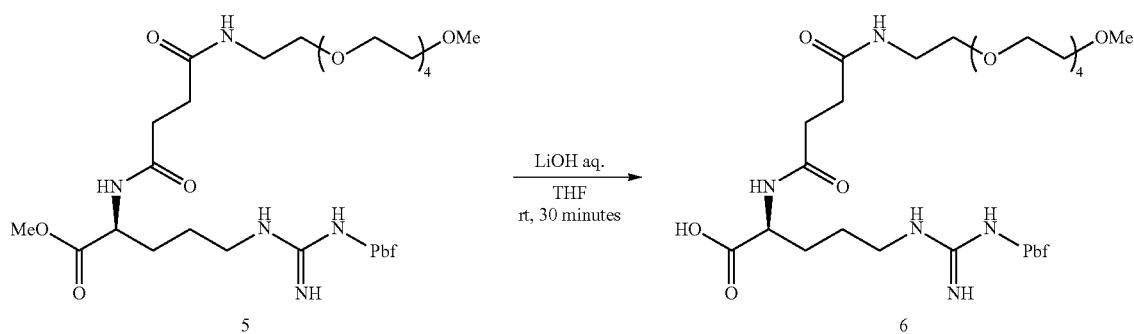

To a CHCl₃ (10 mL) solution of Compound 4 (540 mg, 1 mmol), HOBt·H₂O (203 mg, 1.5 mmol), EDCI·H₂O (288 mg, 1.5 mmol), m-PEG4-amine·HCl (288 mg, 1 mmol) and DIPEA (697 μL, 4 mmol) were added at 0° C. After the reaction mixture was stirred at room temperature overnight, a saturated aqueous NH₄Cl solution was added to terminate the reaction. After the reaction mixture was extracted with CH₂Cl₂, the organic phase was concentrated and dried over MgSO₄. To the crude mixture in THF (10 mL), a 1 M aqueous LiOH solution (2 mL) was added. After stirred at room temperature for 30 minutes, the reaction mixture was filtered. A 1 N aqueous HCl solution was added to quench and extraction was carried out with CHCl₃. The organic phase was dried over MgSO₄ and concentrated under reduced pressure to obtain Compound 6 (N²-(18-oxo-2,5,8,11,14-pentaoxa-17-azahenicosan-21-oyl)-Nᵂ-((2,2,4,6,7-pentamethyl-2,3-dihydrobenzofuran-5-yl)sulfonyl)-L-arginine).

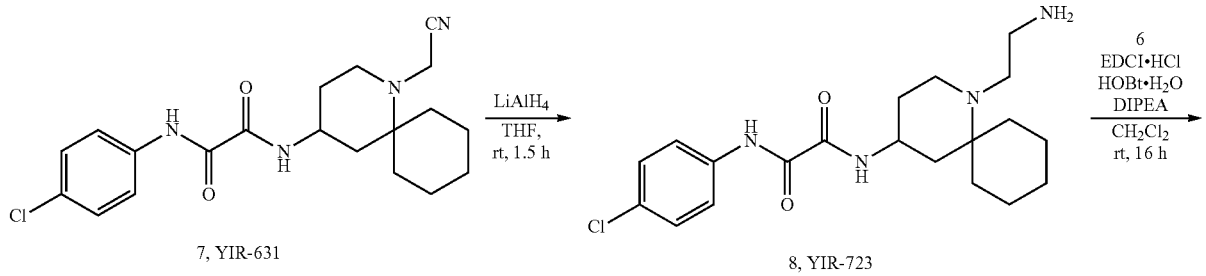

7, YIR-631

8, YIR-723

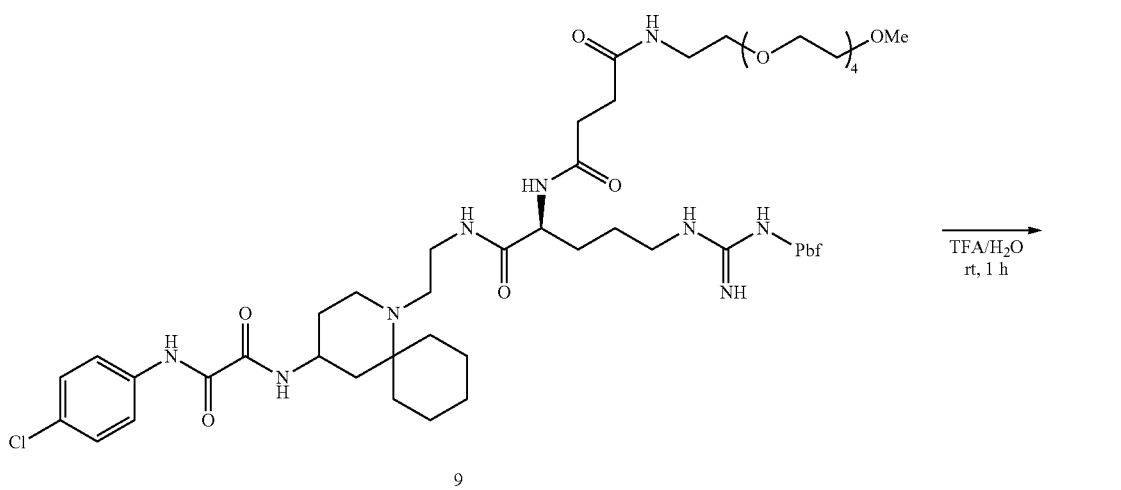

9

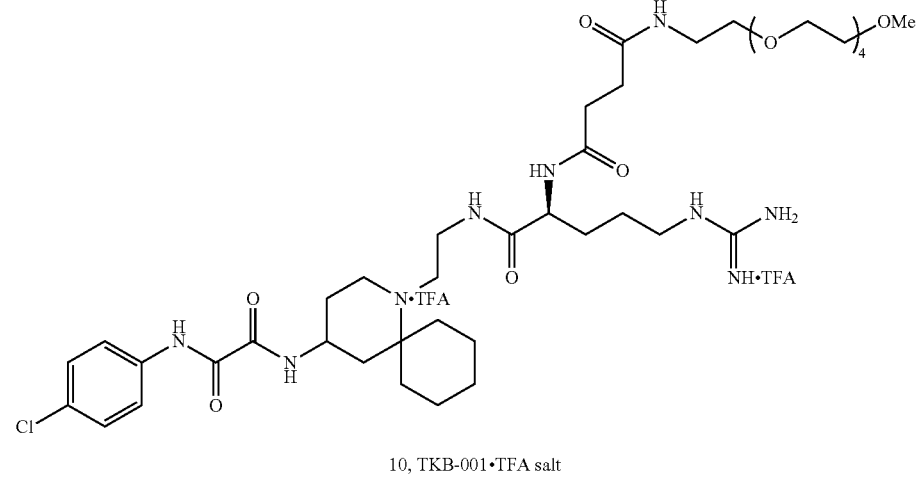

10, TKB-001·TFA salt

To a THF (1.3 mL) solution of Compound 7 (49.7 mg, 127.8 μmol), LiAlH$_4$ (16.0 mg, 421.7 μmol) was added at 0° C. After the reaction mixture was stirred at room temperature for 1.5 hours, a saturated aqueous potassium sodium tartrate solution was added at 0° C. The reaction mixture was basicized with a 1 M aqueous NaOH solution (pH=13 to 14) and extracted with CHCl$_3$. The organic phase was dried over MgSO$_4$ and concentrated under reduced pressure. The crude mixture was dissolved in CH$_2$Cl$_2$ (1 mL) and HOBt·H$_2$O (10.4 mg, 71.1 μmol), EDCI·H$_2$O (13.6 mg, 71.1 μmol), Compound 6 (49.1 mg) and DIPEA (22 μL, 129.2 μmol) were added at 0° C. After the reaction mixture was stirred at room temperature for 16 hours, a saturated aqueous NaHCO$_3$ solution was added to terminate the reaction. After the mixture was extracted with CHCl$_3$, the organic phase was dried over MgSO$_4$. The crude product was dissolved in TFA (540 μL)/H$_2$O (30 μL) at 0° C. The mixture was stirred at room temperature for 1 hour, quenched with a saturated aqueous NaHCO$_3$ solution and extracted with CHCl$_3$. The organic phase was dried over MgSO$_4$, concentrated under reduced pressure and purified by HPLC to obtain a trifluoroacetate salt of Compound 10 (N$^1$-((2S)-1-((2-(4-(2-((4-chlorophenyl)amino)-2-oxoacetamido)-1-azaspiro[5.5]undecan-1-yl)ethyl)amino)-5-guanidino-1-oxopentan-2-yl)-N4-(2,5,8,11,14-pentaoxahexadecan-16-yl)succinamide 2TFA (TKB-001 tetrafluoroacetate)) as a colorless oil (34.3 mg, 30.9 μmol, yield 24% (3 steps)); $t_R$=11.7 minutes (linear gradient of B in A, 30 to 50% in 15 minutes); HRMS (ESI), C$_{54}$H$_{96}$FN$_{10}$O$_{17}^+$ [M+H]$^+$ m/z calculated: 882.4850, found: 882.4852.

Example 2: Synthesis of Compound of the Present Invention 2

Compounds with different PEG chain length were synthesized in the same manner as in Example 1.

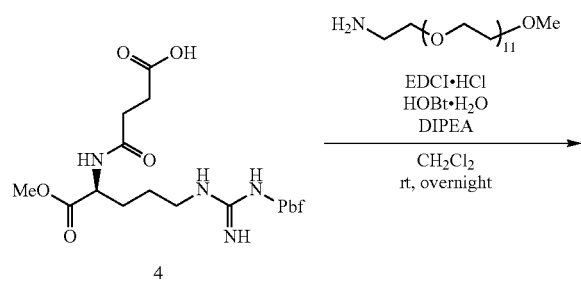

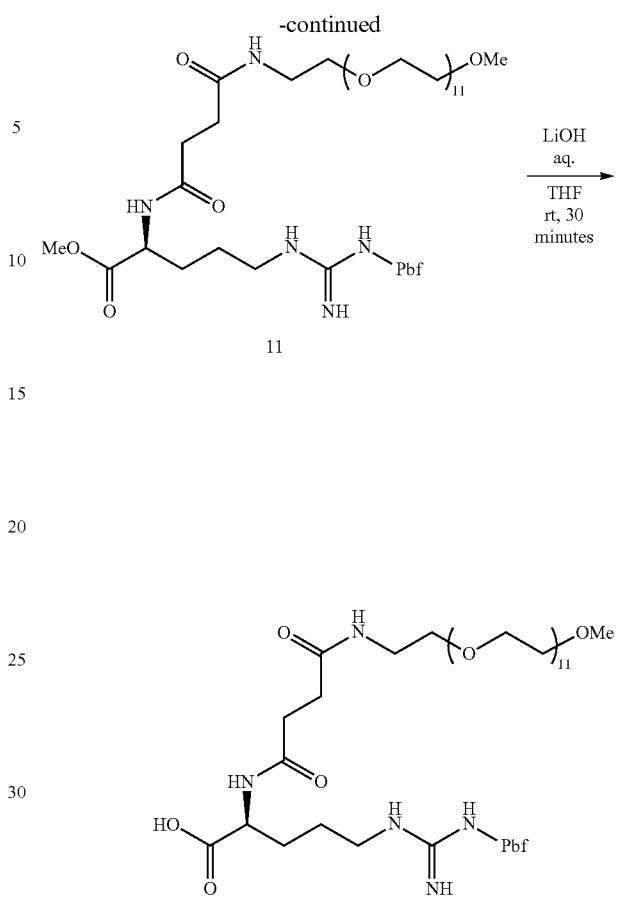

To a CHCl$_3$ (17.9 mL) solution of Compound 4 (1.06 g, 1.97 mmol), HOBt·H$_2$O (301.7 mg, 1.97 mmol), EDCI·H$_2$O (0.378 g, 1.97 mmol), m-PEG11-amine (1.00 g, 1.79 mmol) and DIPEA (0.61 mL, 3.58 mmol) were added at 0° C. After the reaction mixture was stirred at room temperature overnight, a saturated aqueous NH$_4$Cl solution was added to terminate the reaction and extraction was carried out with CH$_2$Cl$_2$. The organic phase was concentrated and dried over MgSO$_4$. To the crude mixture in THF (19.7 mL), a 1 N aqueous LiOH solution (0.39 mL) was added at room temperature. After the reaction mixture was stirred at room temperature for 30 minutes and filtered, a 1 N aqueous HCl solution was added to quench. After the mixture was extracted with CHCl$_3$, the organic phase was dried over MgSO$_4$ and concentrated under reduced pressure to obtain Compound 12 (N$^2$-(39-oxo-2,5,8,11,14,17,20,23,26,29,32,35-dodecaoxa-38-azadotetracontan-42-oyl)-N$^\omega$-((2,2,4,6,7-pentamethyl-2,3-dihydrobenzofuran-5-yl)sulfonyl)-L-arginine).

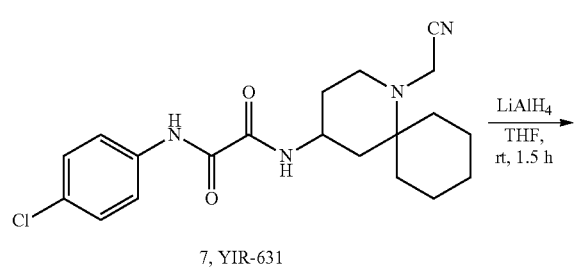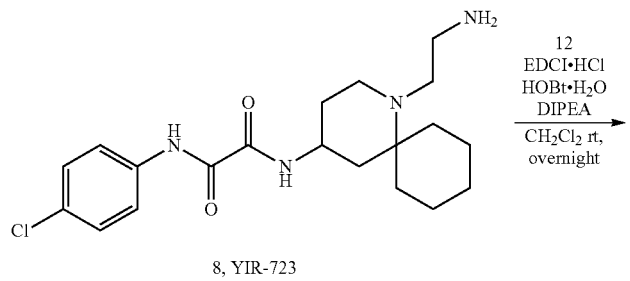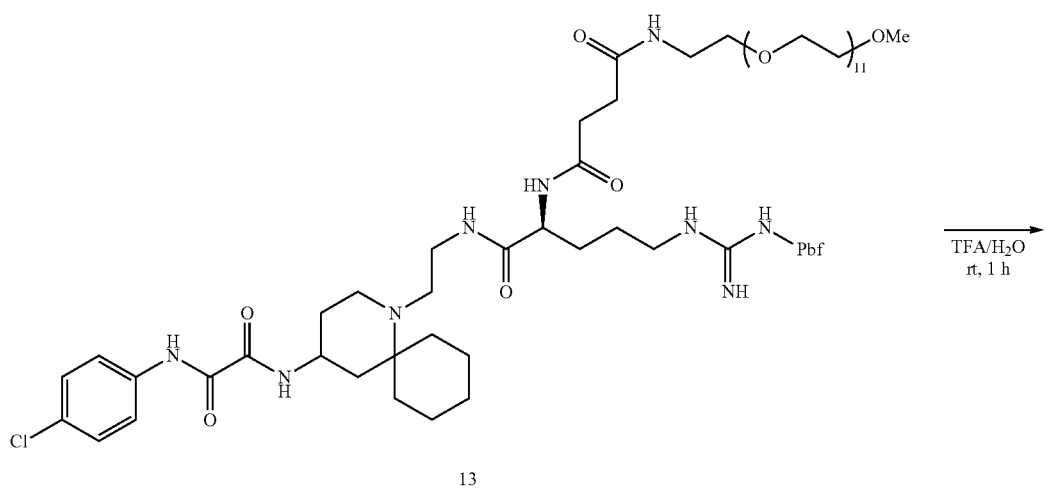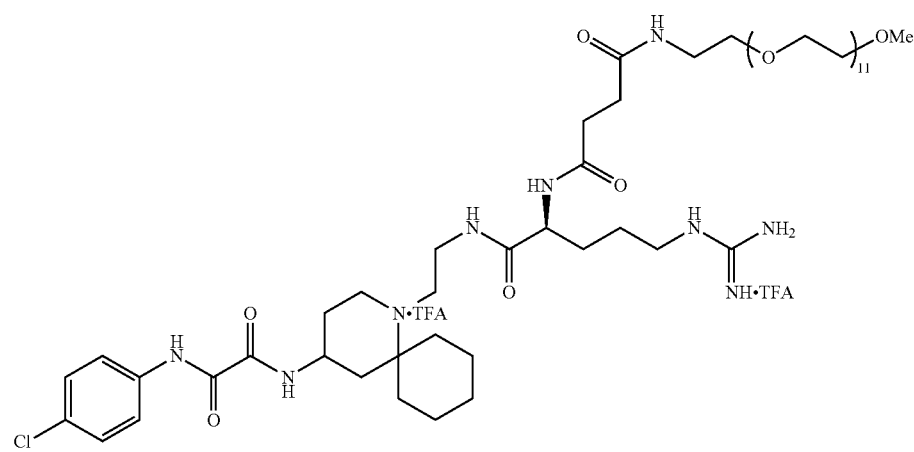

In the same manner as in Example 1, a trifluoroacetate salt of Compound 14 (N¹-((2S)-1-((2-(4-(2-((4-chlorophenyl)amino)-2-oxoacetamido)-1-azaspiro[5.5]undecan-1-yl)ethyl)amino)-5-guanidino-1-oxopentane-2-yl)-N⁴-(2,5,8,11,14,17,20,23,26,29,32,35-dodecaoxaheptatriacontan-37-yl)succinamide·2TFA (TKB-002 trifluoroacetate)) was obtained as a colorless oil.

$t_R$=15.3 minutes (linear gradient of B in A, 30 to 50% in 15 minutes); HRMS (ESI), $C_{55}H_{97}ClN_9O_{17}^+$ [M+H]⁺ m/z calculated: 1190.6685, found: 1190.6688.

Example 3: Synthesis of Compound of the Present Invention 3

Compounds with different PEG chain length were synthesized in the same manner as in Example 1.

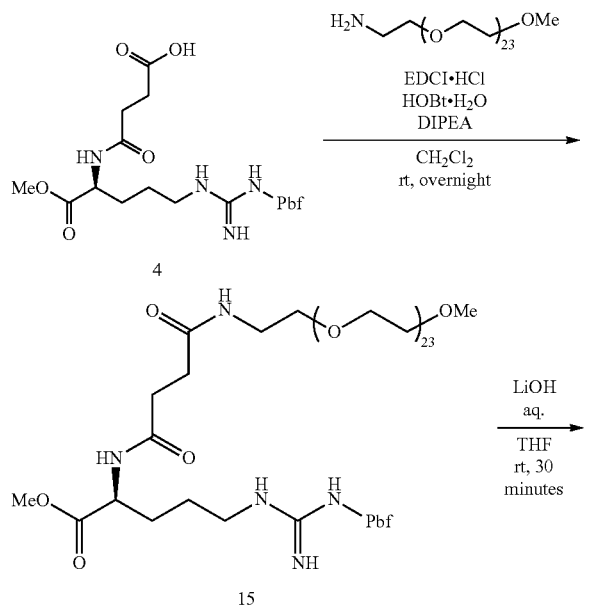

To a CH₂Cl₂ (91 μL) solution of Compound 4 (49 mg, 91.9 μmol), m-PEG23-amine (100 mg, 91.9 μmol), EDCI·H₂O (19.4 mg, 101 μmol), HOBt·H₂O (13.7 mg, 101 μmmol) and DIPEA (32 μL, 184 μmol) were added at 0° C. After the reaction mixture was stirred at room temperature overnight, a saturated aqueous NH₄Cl solution was added to terminate the reaction. After the reaction mixture was extracted with CH₂Cl₂, the organic phase was concentrated/dried over MgSO₄. To the crude mixture in THF (426 μL), 1 N aqueous LiOH solution (92.2 μL) was added at room temperature. The reaction mixture was stirred at room temperature for 30 minutes, filtered, quenched with an aqueous NH₄Cl solution and extracted with CHCl₃. The organic phase was concentrated and dried over MgSO₄ to obtain Compound 16 (N²-(75-oxo-2,5,8,11,14,17,20,23,26,29,32,35,38,41,44,47,50,53,56,59,62,65,68,71-tetracosaoxa-74-aza-octaheptacontan-78-oyl)-Nᵂ-((2,2,4,6,7-pentamethyl-2,3-dihydrobenzofuran-5-yl)sulfonyl)-L-arginine).

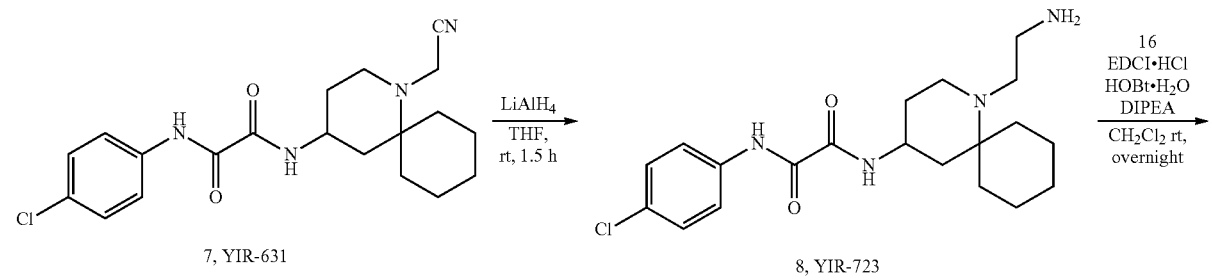

-continued

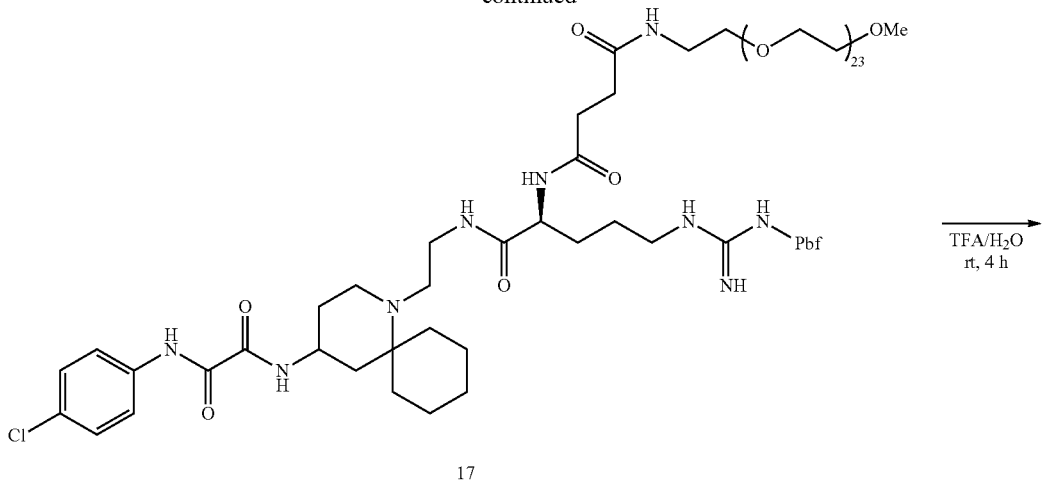

17

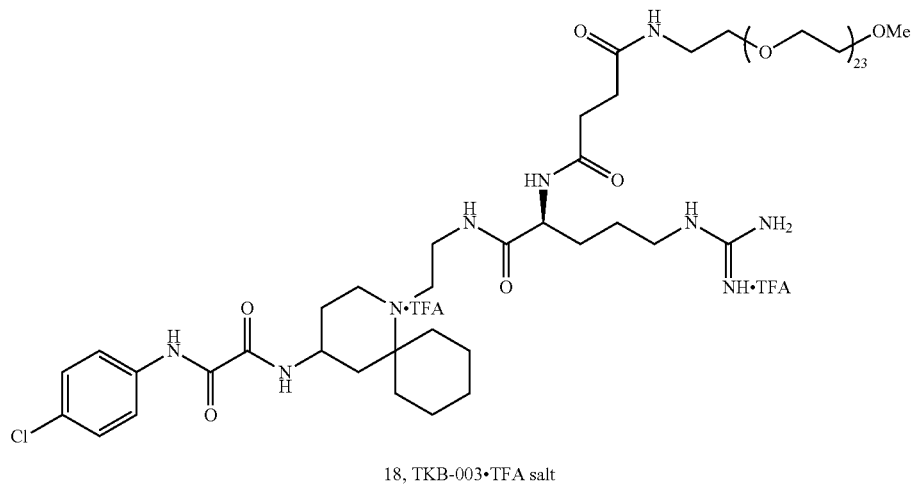

18, TKB-003·TFA salt

In the same manner as in Example 1, a trifluoroacetate salt of compound 18 (N¹-((2S)-1-42-(4-(2-((4-chlorophenyl)amino)-2-oxoacetamido)-1-azaspiro[5.5]undecan-1-yl)ethyl)amino)-5-guanidino-1-oxopentan-2-yl)-N⁴-(2,5,8,11,14,17,20,23,26,29,32,35,38,41,44,47,50,53,56,59,62,65,68,71-tetracosaoxatriheptacontan-73-yl)succinamide·2TFA (TKB-003 trifluoroacetate) was obtained as a colorless oil.

$t_R$=16.8 minutes (linear gradient of B in A, 30 to 50% in 15 minutes); HRMS (ESI), $C_{79}H_{145}ClN_9O_{29}^+$ [M+H]⁺ m/Z calculated: 1718.9831, found: 1718.9830.

Example 4: Measurement of Blood Half-Life of Compound of the Present Invention

In the same manner as in Reference Example 1, Macaque monkey (MM616, body weight 8.78 kg) was intravenously injected with TKB-002 trifluoroacetate obtained in Example 2 at a dose of 23.4 μmol (33.2 mg/20 mL). A blood sample was taken before, during and after administration (at a time point of 10 minutes, 37 minutes, 1 hour, 2.5 hours, 4.5 hours, 6.5 hours and 24 hours after administration). Blood concentration was measured by HPLC in the same conditions as in Reference Example 1.

Figure 2:
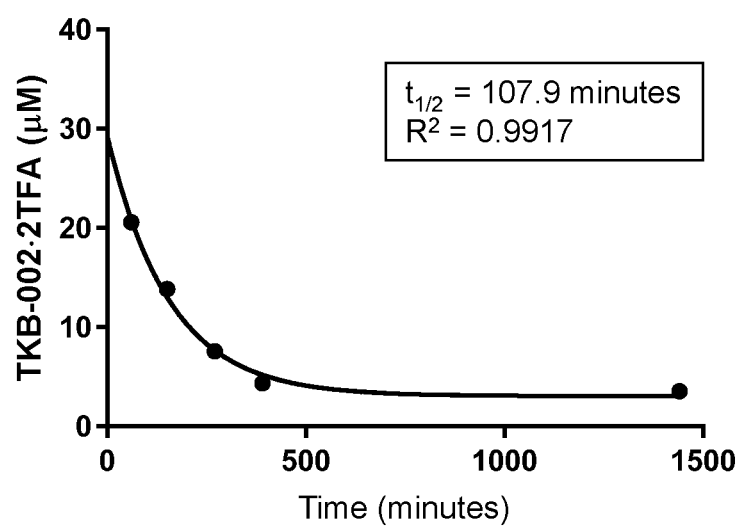
FIG. 2 shows a change in blood concentration of TKB-002·2TFA after administration by intravenous injection.

As a result, the concentration of TKB-002 trifluoroacetate in blood changes as shown in FIG. 2 and the half-life in blood was calculated as 107.9 minutes. It was confirmed that the half-life is 3.48 times longer than that of YIR-821.

Example 5: Synthesis of Compound of the Present Invention 4

Compound of the present invention having an alkyl chain was synthesized in accordance with the following synthesis scheme.

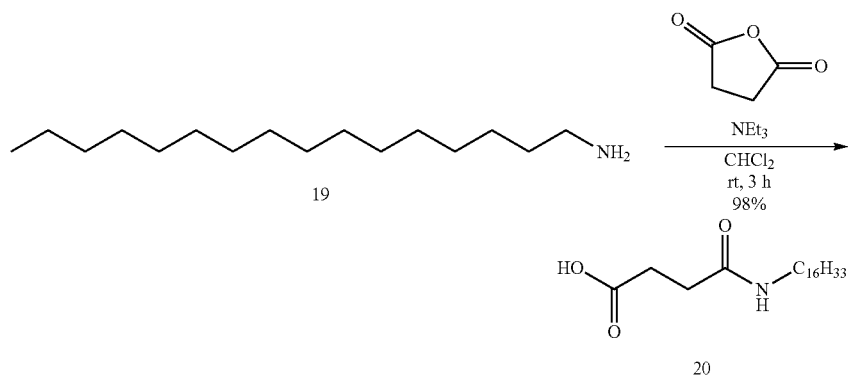

To a DCM (50 mL) solution of Compound 19 (2.4 g, 10 mmol), succinic anhydride (1.1 g, 11 mmol) and Et$_3$N (2.77 mL, 20 mmol) were added at room temperature. After stirring at room temperature for 3 hours, the reaction mixture was concentrated under reduced pressure. The residue was crystallized from acetone to obtain Compound 20 (4-(hexadecylamino)-4-oxobutanoic acid, 3.34 g, yield 98%) as a solid.

$^1$H-NMR (500 MHz, MeOH) δ 0.80-0.83 (t, 3H), 1.20-1.22 (m, 26H), 1.39-1.42 (m, 2H), 2.35-2.37 (t, 2H), 2.48-2.50 (t, 2H), 3.05-3.08 (t, 2H); $^{13}$C NMR (125 MHz, MeOH) δ 14.4, 23.7, 28.0, 30.4 (12C), 31.6, 33.1, 40.5, 174.4, 176.4; HRMS (ESI), C$_{20}$H$_{38}$NO$_3$[M–H]$^-$ m/z calculated: 340.2857, found: 340.2853.

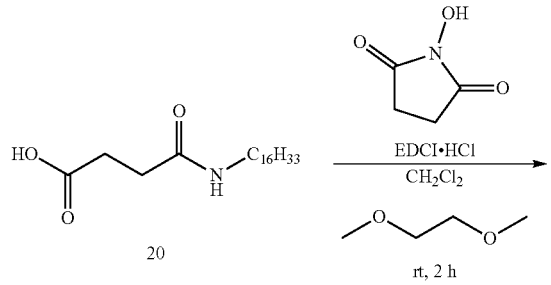

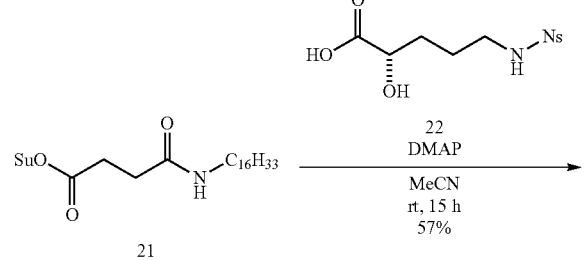

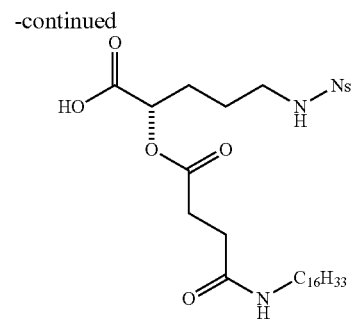

Compound 20 (329 mg, 0.963 mmol) and N-hydroxysuccinimide (222 mg, 1.92 mmol) were added in DME (6.4 mL) and CH$_2$Cl$_2$ (6.4 mL). To the stirring solution, EDCI·HCl (308 mg, 1.61 mmol) was added at room temperature. Two hours later, the reaction mixture was diluted with EtOAc and washed sequentially with water, 1% HCl, 5% aqueous NaHCO$_3$ solution, H$_2$O, and a saline solution. Then, the organic phase was dried (over Na$_2$SO$_4$) and concentrated to obtain an activated ester. This intermediate compound was dissolved in MeCN (6.42 mL), and DMAP (588 mg, 4.81 mmol) and Compound 22 (460 mg, 1.44 mmol) were added thereto at room temperature. The reaction mixture was stirred for 15 hours, and then, acidified with HCl (0.1 M) up to pH 2 at 0° C. After the solution was extracted with EtOAc, extracts were combined and washed with H$_2$O and a saline solution. The mixture solution was dried (over Na$_2$SO$_4$) and concentrated. The residue was purified by column chromatography (CH$_3$Cl/MeOH=30/1 in 1% AcOH) to obtain Compound 23 (2-((4-(hexadecylamino)-4-oxobutanoyl)oxy)-5-((4-nitrophenyl)sulfonamide) pentanoic acid) (355 mg, yield 57%) as a solid.

$^1$H-NMR (500 MHz, MeOH) δ 0.84-0.87 (t, 3H), 1.22 (m, 26H), 1.44-1.46 (m, 2H), 1.64-1.70 (m, 2H), 1.87-1.93 (m, 2H), 2.48-2.52 (m, 2H), 2.68-2.70 (m, 2H), 3.09-3.13 (m, 2H), 3.16-3.20 (m, 2H), 5.00-5.03 (m, 1H), 5.78 (br, 1H), 6.13 (br, 1H), 7.72-7.74 (m, 2H), 7.82-7.84 (m, 1H), 8.09-8.10 (m, 1H); $^{13}$C NMR (125 MHz, CDCl$_3$) δ 14.0, 22.6, 26.8, 27.8, 29.2, 29.5 (12C), 30.9, 31.8, 39.8, 43.1, 71.6, 125.2, 128.2, 129.0, 130.9, 132.8, 133.6, 148.0, 171.8, 172.4; HRMS (ESI), C$_{31}$H$_{52}$N$_3$O$_9$S [M+H]$^+$ m/z calculated: 640.3273, found: 640.3275.

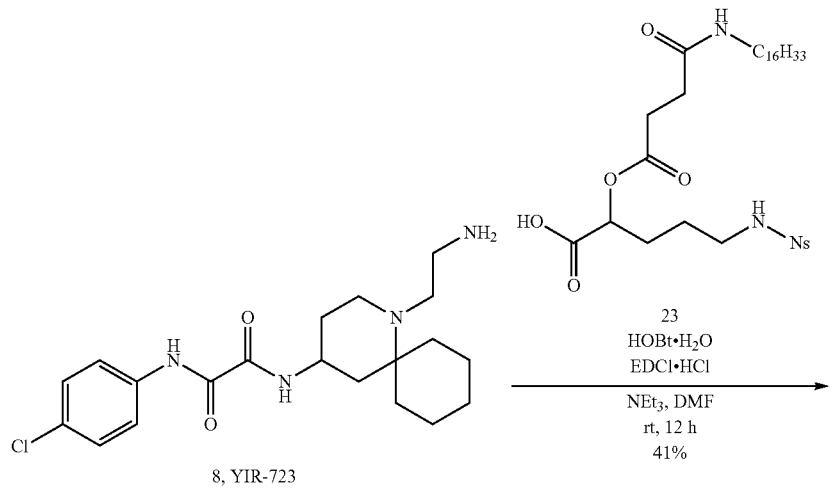

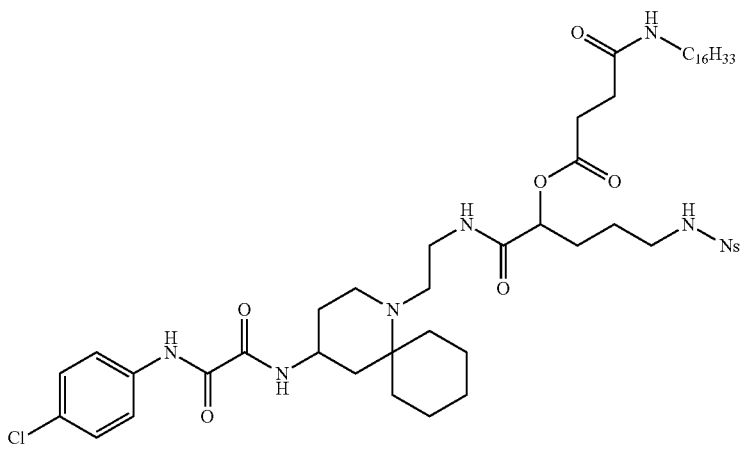

To a solution of Compound 23 (543 mg, 0.846 mmol) in DMF (2.82 mL), HOBt·H₂O (216 mg, 1.41 mmol), EDCI·HCl (270 mg, 1.41 mmol), Compound 8 (111 mg, 0.282 mmol) and NEt₃ (0.273 mL, 1.97 mmol) were added at 0° C. After the reaction mixture was stirred at room temperature for 12 hours, a saturated aqueous NaHCO₃ solution was added at 0° C. to quench. After extracted with CHCl₃, the organic phase was dried over Na₂SO₄, concentrated under reduced pressure and purified by column chromatography (CHCl₃/MeOH=10/1 to 6/1) to obtain Compound 24 (1-((2-(4-(2-((4-chlorophenyl)amino)-2-oxoacetamido)-1-azaspiro[5.5]undecan-1-yl)ethyl)amino)-5-((4-nitrophenyl)sulfonamido)-1-oxopentan-2-yl 4-(hexadecylamino)-4-oxobutanoate) (116.5 mg, yield 41%) as a solid.

¹H-NMR (500 MHz, MeOH) δ 0.84-0.87 (t, 3H), 1.10-1.14 (m, 3H), 1.23 (m, 28H), 1.34-1.65 (m, 12H), 1.88-1.93 (m, 4H), 2.13-2.34 (m, 3H), 2.53-2.80 (m, 6H), 2.94-3.00 (m, 2H), 3.09 (m, 2H), 3.14-3.37 (m, 4H), 3.93-3.98 (m, 1H), 5.20-5.22 (m, 1H), 5.70-5.84 (m, 2H), 7.29-7.31 (m, 2H), 7.57-7.60 (m, 2H), 7.71-7.73 (m, 2H), 7.82-7.84 (m, 1H), 8.08-8.11 (m, 1H), 9.36 (br, 1H); ¹³C NMR (125 MHz, CDCl₃) δ 14.1, 22.2, 22.6, 24.9, 25.1, 26.0, 26.9, 28.4, 28.6, 29.6 (12C), 30.9, 31.4, 31.8, 37.4, 37.7, 38.0, 39.8, 43.1, 44.5, 45.2, 46.1, 46.3, 56.5, 72.9, 120.9 (2C), 125.2 (2C), 128.1, 129.0, 131.0, 132.7, 133.5, 135.0, 148.0, 157.5, 158.9, 169.1, 171.0, 171.7; HRMS (ESI), $C_{51}H_{79}ClN_7O_{10}S$ [M+H]$^+$ m/z calculated: 1016.5292, found: 1016.5292.
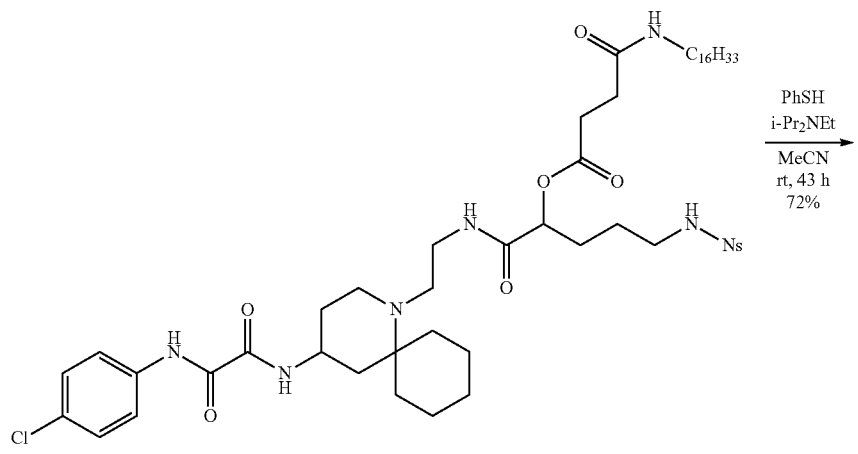
24
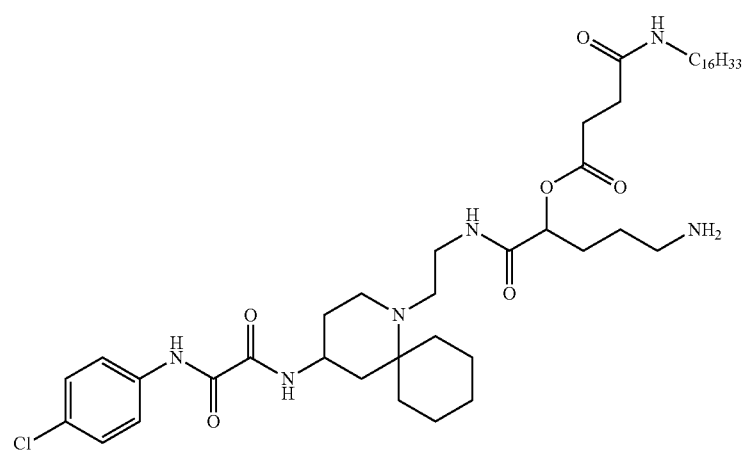
25

To a solution of Compound 24 (65.0 mg, 0.064 mmol) in MeCN (0.64 mL), PhSH (0.014 mL, 0.14 mmol) and i-Pr$_2$NEt (0.023 mL, 0.14 mmol) were added at room temperature. The reaction mixture was stirred at room temperature for 43 hours, then concentrated under reduced pressure and purified by column chromatography (CHCl$_3$/MeOH=10/1 to 6/1) to obtain Compound 25 (5-amino-1-((2-(4-(2-((4-chlorophenyl)amino)-2-oxoacetamido)-1-azaspiro[5.5]undecan-1-yl)ethyl)amino)-1-oxopentan-2-yl 4-(hexadecylamino)-4-oxobutanoate) (38.5 mg, yield 72%) as a white powder.

$^1$H-NMR (500 MHz, MeOH) δ 0.84-0.87 (t, 3H), 1.10-1.13 (m, 4H), 1.23 (m, 28H), 1.45-1.65 (m, 10H), 1.86-1.99 (m, 5H), 2.14-2.31 (m, 2H), 2.44-2.86 (m, 7H), 2.98-3.01 (m, 1H), 3.14-3.36 (m, 4H), 3.97 (m, 1H), 5.22 (m, 1H), 6.05 (br, 2H), 7.29-7.31 (m, 2H), 7.43 (m, 1H), 7.57-7.59 (m, 2H), 9.39 (br, 1H); $^{13}$C NMR (125 MHz, CDCl$_3$) δ 14.1, 22.2, 22.6, 24.0, 25.2, 26.0, 27.0, 28.7, 29.3, 29.7 (12C), 31.0, 31.3, 33.9, 37.2, 37.8, 39.8, 44.4, 45.3, 46.2, 46.5, 56.8, 70.5, 72.9, 120.9 (2C), 129.1 (2C), 130.2, 135.0, 157.6, 159.0, 169.5, 171.3, 171.7; HRMS (ESI), C$_{45}$H$_{76}$ClN$_6$O$_6$ [M+H]$^+$ m/z calculated: 831.5509, found: 831.5505.

concentrated under reduced pressure and purified by HPLC to obtain a trifluoroacetate salt of Compound 26 (1-((2-(4-(2-((4-chlorophenyl)amino)-2-oxoacetamido)-1-azaspiro[5.5]undecan-1-yl)ethyl)amino)-5-guanidino-1-oxopentan-2-yl 4-(hexadecylamino)-4-oxobutanoate) as a white powder (36.7 mg, yield 88%). Compound 26 was designated as YIS-527 trifluoroacetate. Compound YIS-527 is a compound represented by formula (I) herein wherein R$^1$ is C$_{16}$H$_{33}$ (R$^1$ represents C$_m$H$_{2m+1}$, m is 16) and R$^2$ is O, and having an alkyl chain.

$^1$H-NMR (500 MHz, MeOH) δ 0.87-0.90 (t, 3H), 1.26 (m, 26H), 1.48 (m, 3H), 1.54-1.99 (m, 15H), 2.17-2.23 (m, 2H), 2.56-2.78 (m, 5H), 2.91-2.93 (m, 1H), 3.13-3.23 (m, 4H), 3.38 (m, 2H), 3.58-3.78 (m, 4H), 4.16 (m, 1H), 5.07 (m, 1H), 7.33-7.35 (m, 2H), 7.72-7.74 (m, 2H); $^{13}$C NMR (125 MHz, CDCl$_3$) δ 14.4, 18.4, 22.4, 22.7, 23.7, 25.0, 25.7, 28.1, 29.7, 30.3 (12C), 31.0, 33.1, 34.9, 36.8, 37.8, 40.6, 41.8, 42.8, 49.8, 51.4, 58.3, 74.6, 79.5, 122.9 (2C), 129.9 (2C), 131.1, 137.4, 158.7, 159.4, 161.4, 162.3, 174.1, 175.1; HRMS (ESI), C$_{46}$H$_{78}$ClN$_8$O$_6$[M+H]$^+$ m/z calculated: 873.5727, found: 873.5724.

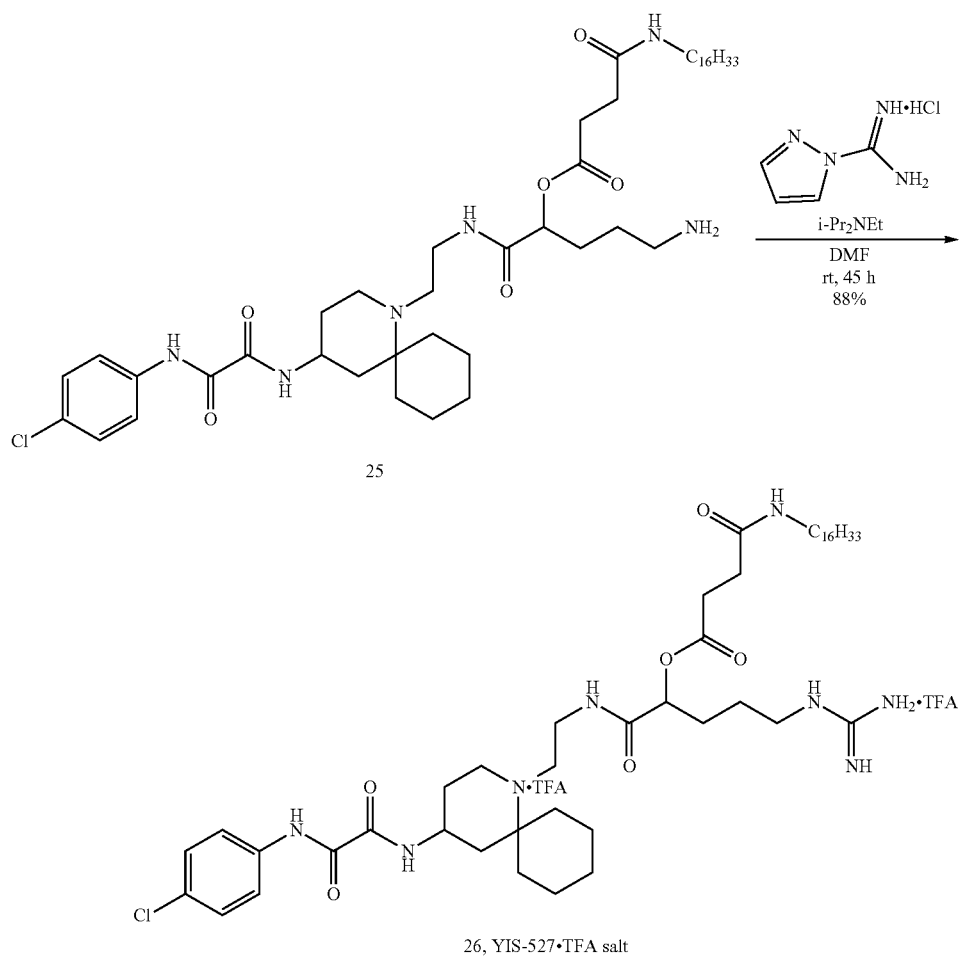

To a solution of Compound 25 (39.9 mg, 0.048 mmol) in DMF (0.96 mL), i-Pr$_2$NEt (0.01 mL, 0.059 mmol) and 1H-pyrazole 1-carboxyamidine hydrochloride (7.7 mg, 0.053 mmol) were added at room temperature. The reaction mixture was stirred at room temperature for 45 hours, then Example 6: Synthesis of Compound of the Present Invention 5

Compounds of the present invention having a PEG chain were synthesized in the same manner as in Example 5.

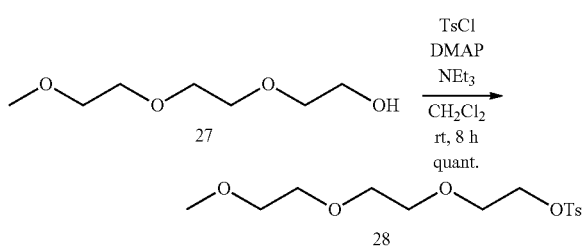

Compound 28 (2-(2-(2-methoxyethoxy)ethoxy)ethyl 4-methylbenzenesulfonate) was synthesized from Compound 27 as previously reported (Sheik, D A. et al., J. Am. Chem. Soc. 9, 1829-1836 (2015)).

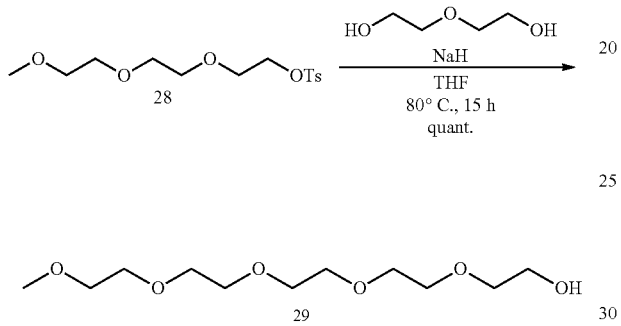

Compound 29 (2,5,8,11,14-pentaoxahexadecan-16-ol) was synthesized from Compound 28 as previously reported (Zhao, B. et al., Macromolecules. 38, 9509-9517 (2005)).

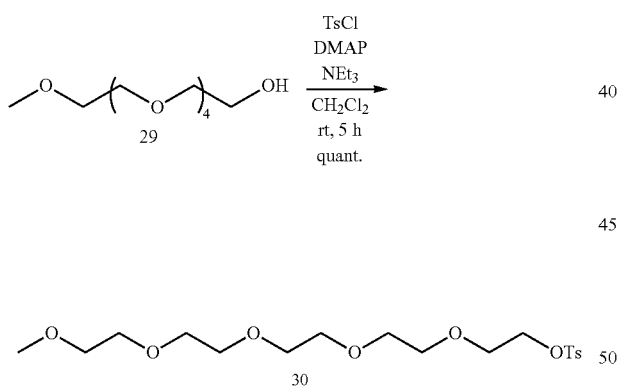

Compound 30 (2,5,8,11,14-pentaoxahexadecan-16-yl 4-methylbenzenesulfonate) was synthesized from Compound 29 as previously reported (Wolfe, A L. et al., J. Med. Chem. 56, 6845-6857 (2013)).

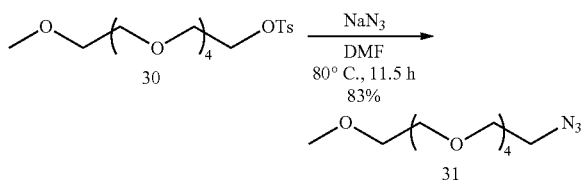

To a stirring solution of Compound 30 (813 mg, 2 mmol) in DMF (2 mL), $NaN_3$ (308 mg, 1.61 mmol) was added at room temperature. The reaction mixture was stirred at 80° C. for 11.5 hours, and then concentrated under reduced pressure. A precipitate was filtered to obtain Compound 31 (16-azido-2,5,8,11,14-pentaoxahexadecane) (355 mg, yield 57%) as a solid.

$^1$H-NMR (400 MHz, $CDCl_3$) δ 3.37-3.40 (m, 5H), 3.53-3.56 (m, 2H), 3.63-3.68 (m, 16H; $^{13}$C NMR (125 MHz, $CDCl_3$) δ 50.7, 59.0, 70.0, 70.6 (7C), 71.9; HRMS (ESI), $C_{11}H_{23}N_3NaO_5[M+H]^+$ m/z calculated: 300.1530, found: 300.1526.

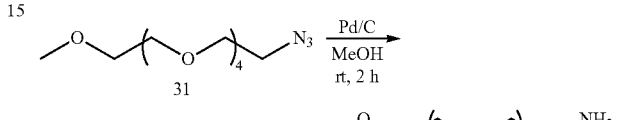

Compound 32 (2,5,8,11,14-pentaoxahexadecan-16-amine) was synthesized from Compound 31 as previously reported (Wolfe, A L. et al., J. Med. Chem. 56, 6845-6857 (2013)).

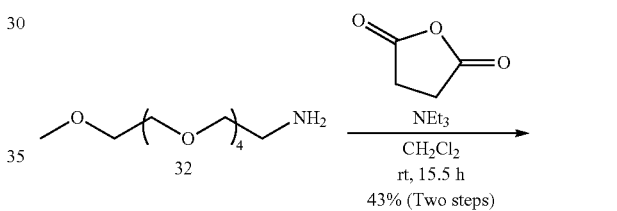

To a solution of Compound 32 (2.4 g, 10 mmol) in DCM (50 mL), succinic anhydride (1.1 g, 11 mmol) and $Et_3N$ (2.77 mL, 20 mmol) were added at room temperature. The reaction mixture was stirred at room temperature for 3 hours, and then concentrated under reduced pressure. The residue was crystallized from acetone to obtain Compound 33 (18-oxo-2,5,8,11,14-pentaoxa-17-azahenicosan-21-oic acid) (3.34 g, yield 98%) as a yellow oil.

$^1$H-NMR (400 MHz, $CDCl_3$) δ 2.53-2.56 (t, 2H), 2.65-2.68 (t, 2H), 3.37 (s, 3H), 3.43-3.46 (m, 2H), 3.53-3.70 (m, 18H); $^{13}$C NMR (125 MHz, $CDCl_3$) δ 28.7, 30.9, 39.5, 58.9, 70.2, 70.4 (7C), 71.8, 172.6, 172.7; HRMS (ESI), $C_{15}H_{30}N_7O_8[M+H]^+$ m/z calculated: 352.1966, found: 352.1967.

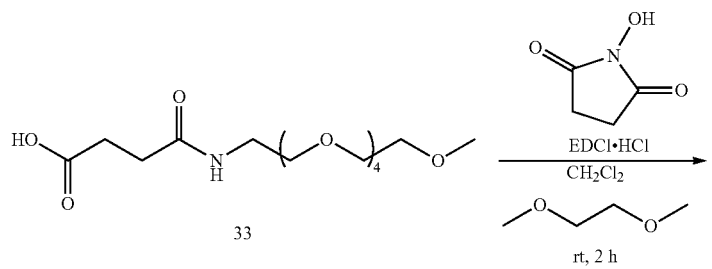

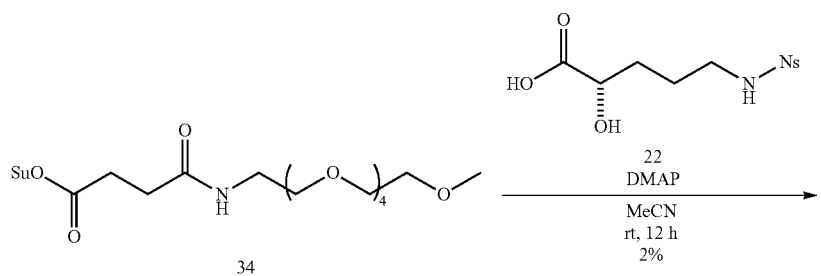

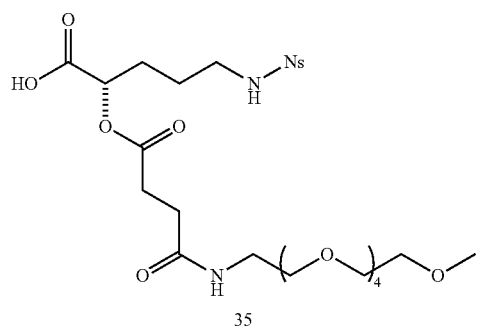

To a stirring solution of Compound 33 (1.05 g, 2.5 mmol) and N-hydroxysuccinimide (575 mg, 5 mmol) in DME (16.7 mL)/CH$_2$Cl$_2$ (16.7 mL), EDCI·HCl (800 mg, 4.175 mmol) was added at room temperature. Two hours later, the reaction mixture was diluted with EtOAc and washed with water, 1% HCl, a 5% aqueous NaHCO$_3$ solution, H$_2$O and a saline solution. Subsequently, the organic phase was dried (over Na$_2$SO$_4$) and concentrated to obtain an activated ester. This intermediate was dissolved in MeCN (20 mL), and DMAP (1.83 g, 15 mmol) and Compound 22 (1.43 g, 4.5 mmol) were added thereto at room temperature. The reaction mixture was stirred for 12 hours and then acidified with HCl (0.1 M) up to pH 2 at 0° C. The solution was extracted with EtOAc. Extracts were combined and washed with H$_2$O and a saline solution. The mixture was dried (over Na$_2$SO$_4$) and concentrated. The residue was purified by column chromatography (CH$_3$Cl/MeOH=30/1 in 1% AcOH) to obtain Compound (2-((4-(hexadecylamino)-4-oxobutanoyl)oxy)-5-((4-nitrophenyl)sulfonamido)pentanoic acid) (36.3 mg, yield 2%) as a yellow oil.

$^1$H-NMR (500 MHz, MeOH) δ 1.65-1.72 (m, 2H), 1.71-1.98 (m, 2H), 2.61-2.64 (m, 2H), 2.68-2.78 (m, 2H), 3.11-3.15 (m, 2H), 3.34 (s, 3H), 3.45-3.68 (m, 20H), 5.01-5.03 (m, 1H), 5.58 (br, 1H), 7.37 (br, 1H), 7.74-7.76 (m, 2H), 7.84-7.86 (m, 1H), 8.10-8.11 (m, 1H); $^{13}$C NMR (125 MHz, CDCl$_3$) δ 25.3, 27.7, 29.8, 30.9, 39.8, 43.0, 58.7, 69.2, 69.7 (7C), 71.5, 71.9, 125.4, 131.0, 132.9, 133.4, 133.7, 148.0, 172.2, 172.4, 174.1; HRMS (ESI), C$_{26}$H$_{42}$N$_3$O$_{14}$S [M−H]$^-$ m/z calculated: 650.2236, found: 650.2233.

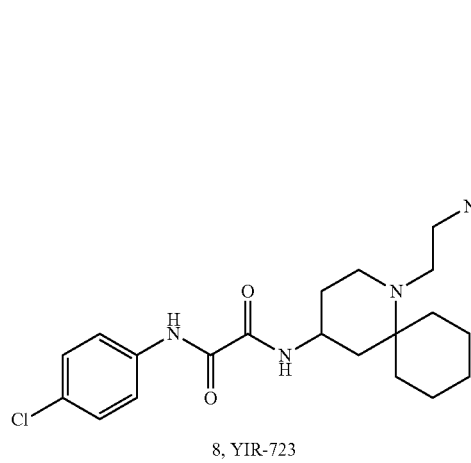
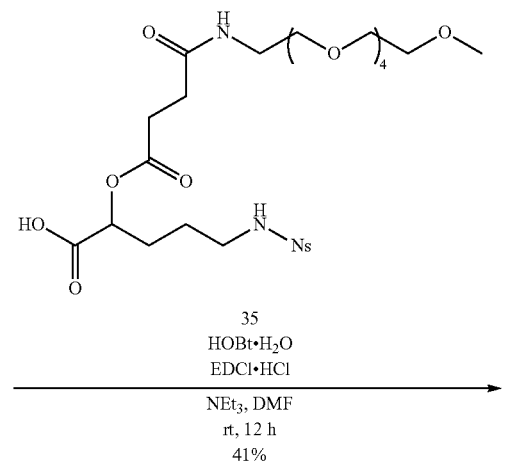

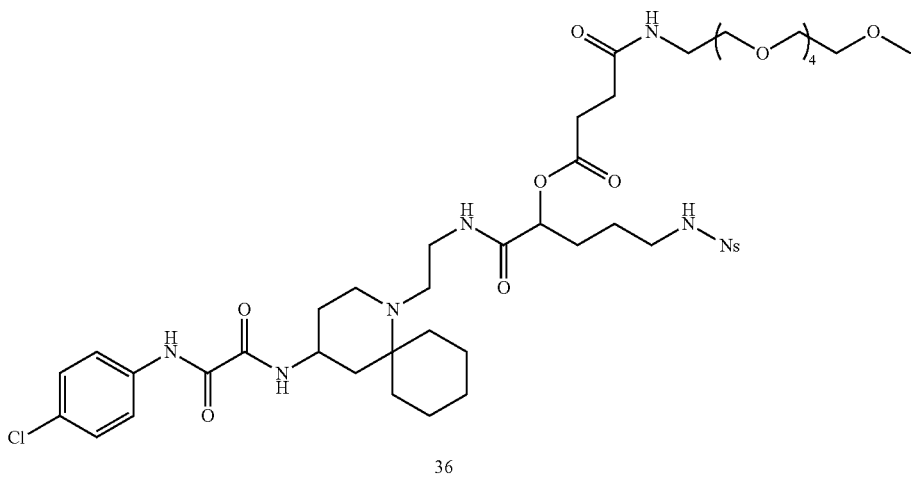

To a solution of Compound 35 (99.0 mg, 0.152 mmol) in DMF (0.51 mL), HOBt·H₂O (38.8 mg, 0.25 mmol), EDCI·HCl (48.5 mg, 0.25 mmol), Compound 8 (20 mg, 0.05 mmol) and NEt₃ (0.026 mL, 0.15 mmol) were added at 0° C. The reaction mixture was stirred at room temperature for 12 hours, quenched with a saturated aqueous NaHCO₃ solution at 0° C. and extracted with CHCl₃. The organic phase was dried over Na₂SO₄, then concentrated under reduced pressure and purified by column chromatography (CHCl₃/MeOH=10/1 to 6/1) to obtain Compound 36 (1-((2-(4-(2-((4-chlorophenyl)amino)-2-oxoacetamido)-1-azaspiro[5.5]undecan-1-yl)ethyl)amino)-5-((4-nitrophenyl)sulfonamido)-1-oxopentan-2-yl 18-oxo-2,5,8,11,14-(pentaoxa-17-azahenicosan-21-oate) (21.3 mg, yield 41%) as a yellow oil.

$^1$H-NMR (500 MHz, MeOH) δ 1.12-1.43 (m, 9H), 1.60-1.73 (m, 7H), 1.86-1.92 (m, 4H), 2.22-2.36 (m, 2H), 2.58-2.80 (m, 7H), 3.05-3.10 (m, 4H), 3.36 (s, 3H), 3.46-3.72 (m, 20H), 3.95-3.99 (m, 1H), 5.21-5.22 (m, 1H), 7.31-7.32 (m, 2H), 7.57-7.59 (m, 2H), 7.71-7.73 (m, 2H), 7.81-7.84 (m, 1H), 8.10-8.11 (m, 1H), 9.32 (br, 1H); $^{13}$C NMR (125 MHz, CDCl₃) δ 18.4, 22.1, 22.2, 25.0, 25.1, 25.9, 28.5, 29.6, 30.4, 30.6, 37.4, 39.4, 43.1, 44.3, 50.7, 58.4, 59.0, 69.7 (2C), 70.1 (7C), 70.4, 71.8, 72.8, 120.9 (2C), 125.2 (2C), 129.2, 130.3, 131.0, 132.6, 133.4, 133.6, 135.0, 148.0, 157.4, 159.0, 169.4, 171.4, 171.7; HRMS (ESI), $C_{46}H_{69}ClN_7O_{15}S$ [M+H]⁺ m/z calculated: 1026.4255, found: 1026.4251.

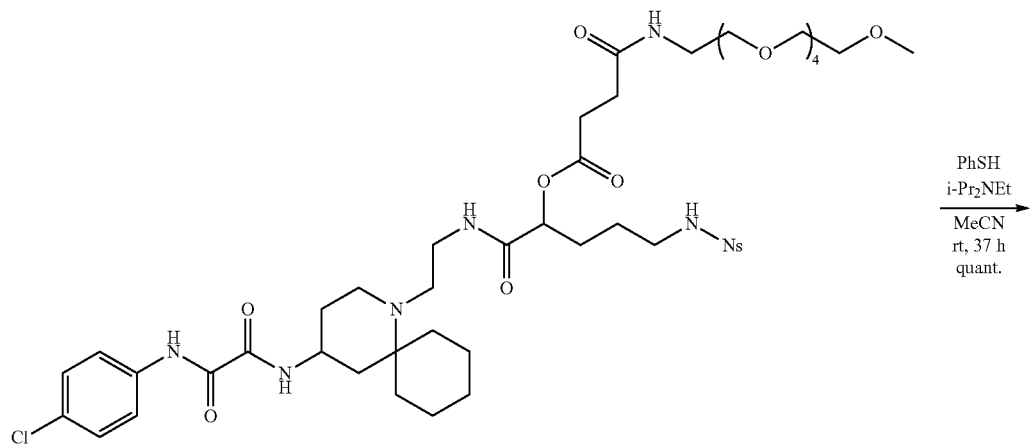

36

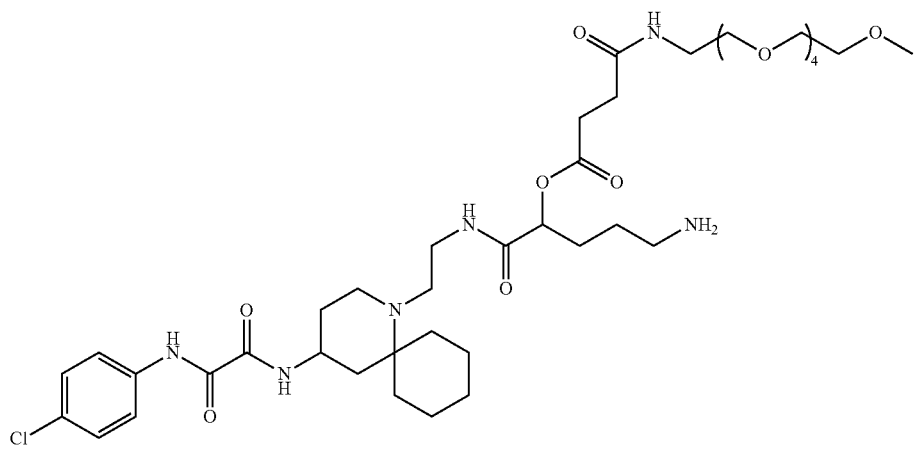

37

To a solution of Compound 36 (21.3 mg, 0.021 mmol) in MeCN (0.21 mL), PhSH (0.005 mL, 0.05 mmol) and i-Pr₂NEt (0.007 mL, 0.04 mmol) were added at room temperature. The reaction mixture was stirred at room temperature for 37 hours, then concentrated under reduced pressure and purified by column chromatography (CHCl₃/MeOH=10/1 to 6/1) to obtain Compound 37 (5-amino-1-((2-(4-(2-((4-chlorophenyl)amino)-2-oxoacetamido)-1-azaspiro[5.5]undecan-1-yl)ethyl)amino)-1-oxopentan-2-yl 18-oxo-2,5,8,11,14-pentaoxa-17-azahenicosan-21-oate) (24.3 mg, yield 99%) as a yellow oil.

¹H-NMR (500 MHz, MeOH) δ 1.11-1.33 (m, 11H), 1.53-1.72 (m, 7H), 1.83-2.01 (m, 4H), 2.18-2.31 (m, 2H), 2.56-3.02 (m, 9H), 3.26 (s, 3H), 3.53-3.65 (m, 20H), 3.95-3.97 (m, 1H), 4.43 (br, 2H), 5.30-5.32 (m, 1H), 7.31-7.33 (m, 2H), 7.57-7.59 (m, 2H), 9.30 (br, 1H); ¹³C NMR (125 MHz, CDCl₃) δ 18.4, 22.2, 22.3, 25.0, 25.2, 26.1, 28.6, 29.6, 30.2, 31.5, 37.3, 39.6, 44.6, 45.5, 46.6, 56.5, 58.9, 69.9 (2C), 70.2 (7C), 70.4, 71.6, 72.9, 120.9 (2C), 129.2 (2C), 130.3, 135.0, 157.5, 159.0, 169.5, 170.8, 172.6; HRMS (ESI), C₄₀H₆₆ClN₆O₁₁[M+H]⁺ m/z calculated: 841.4473, found: 841.4476.

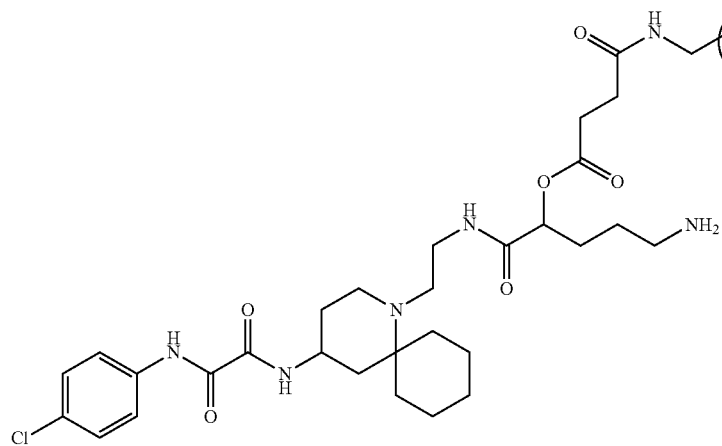
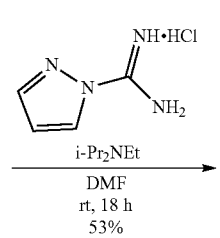

37

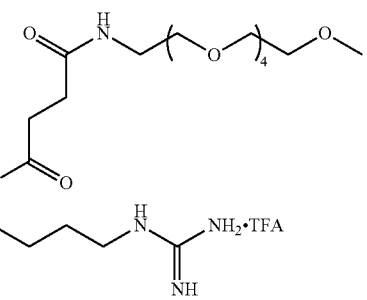

38, YIS-540•TFA salt

To a solution of Compound 37 (24.3 mg, 0.029 mmol) in DMF (0.58 mL), i-Pr$_2$NEt (0.06 mL, 0.035 mmol) and 1H-pyrazole-1-carboxyamidine hydrochloride (4.6 mg, 0.032 mmol) were added at room temperature. The reaction mixture was stirred at room temperature for 18 hours, then concentrated under reduced pressure and purified by HPLC to obtain a trifluoroacetate salt of Compound 38 (1-((2-(4-(2-((4-chlorophenyl)amino)-2-oxoacetamido)-1-azaspiro[5.5]undecan-1-yl)ethyl)amino)-5-guanidino-1-oxopentan-2-yl 18-oxo-2,5,8,11,14-pentaoxa-17-azahenicosan-21-oate) as a yellow oil (24.1 mg, yield 45%). Compound 38 was designated as YIS-540 trifluoroacetate. Compound YIS-540 is a compound represented herein by formula (I) wherein R$^1$ is C$_2$H$_4$ (OC$_2$H$_4$)$_4$—OCH$_3$ (R$^1$ represents —C$_2$H$_4$ (OC$_2$H$_4$)$_n$—OCH$_3$, and n is 4) and R$^2$ is O, and having a PEG chain.

$^1$H-NMR (500 MHz, MeOH) δ 1.12-1.26 (m, 3H), 1.42-1.48 (m, 3H), 1.68-2.18 (m, 17H), 2.18-2.31 (m, 2H), 2.68-2.82 (m, 5H), 3.20 (br, 2H), 3.36-3.77 (m, 23H), 4.10 (m, 1H), 5.10 (m, 1H), 7.32-7.34 (m, 2H), 7.57-7.59 (m, 2H); $^{13}$C NMR (125 MHz, CDCl$_3$) δ 18.1, 21.2, 21.4, 24.5, 28.1, 28.5, 28.7, 29.3, 29.7, 30.1, 33.4, 35.1, 35.3, 39.3, 39.4, 40.5, 41.7, 50.7, 58.6, 69.7, 69.9, 70.0 (7C), 71.4, 72.9, 121.1 (2C), 129.3 (2C), 130.6, 134.8, 157.0, 159.6, 160.4, 172.2, 173.6; HRMS (ESI), C$_{41}$H$_{68}$ClN$_8$O$_{11}$[M+H]$^+$ m/z calculated: 883.4691, found: 883.4694.

Example 7: Stability of Compound of the Present Invention 1

The compound obtained in Example 5 (YIS-527) has an alkyl chain bound to a side chain of YIR-821 via a —C(═O)O— group, and it is assumed that the compound is hydrolyzed in vitro and in vivo. Accordingly, in this Example, an alkyl chain released in vitro was measured.

Figure 3:
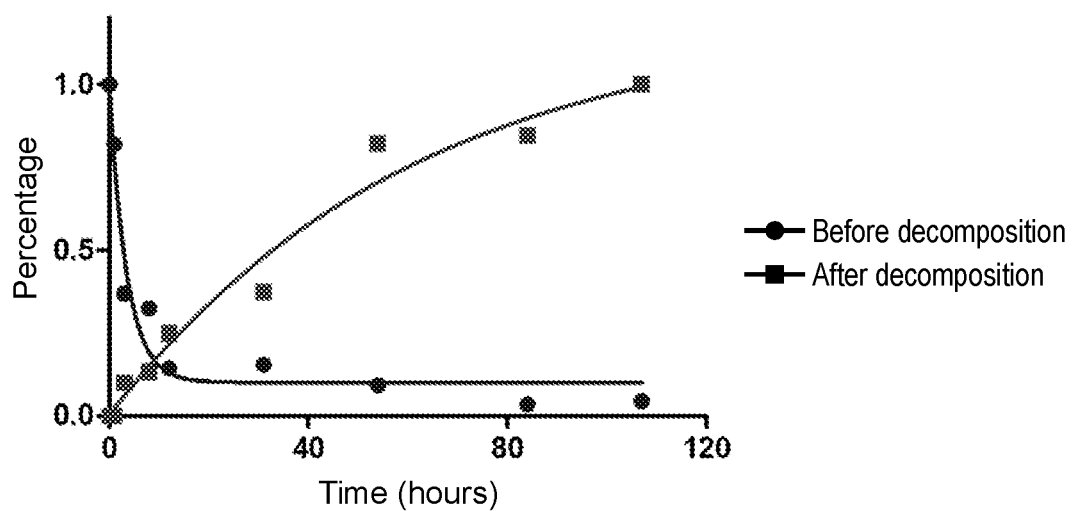
FIG. 3 shows decomposition over time releasing an alkyl chain of YIR-821 derivative in vitro.

As a result, the following decomposition reaction was observed in PBS of pH7.4 at 37° C. The results are shown in FIG. 3.

Figure 4:
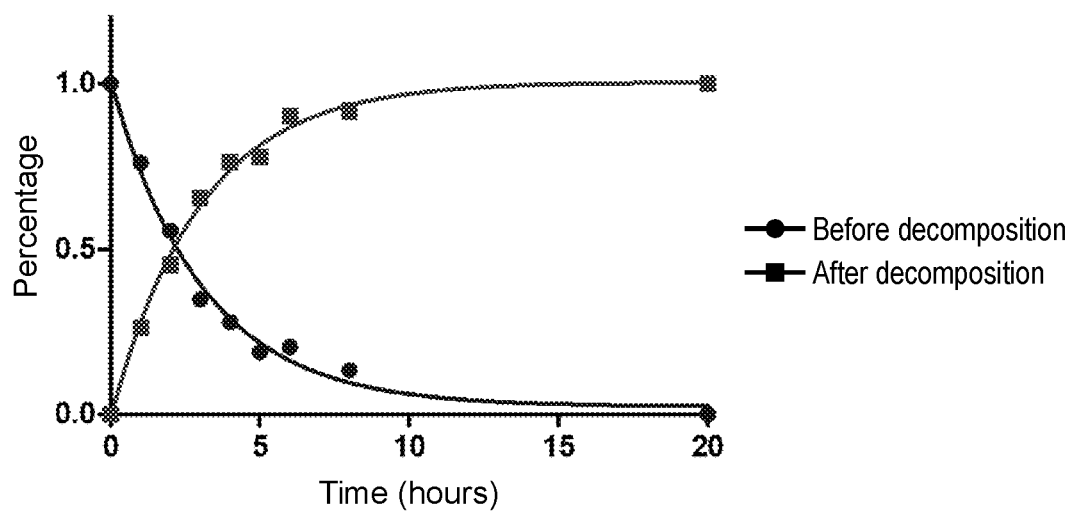
FIG. 4 shows decomposition over time releasing a PEG chain of YIR-821 derivative, in vitro.

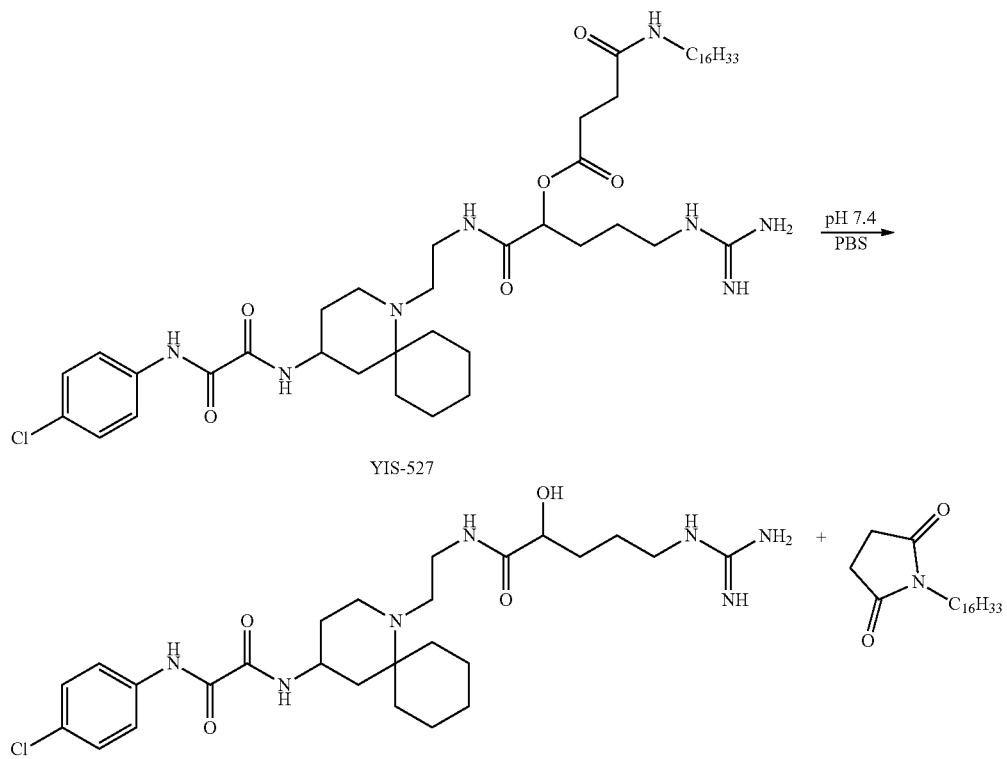
Example 8: Stability 2 of Compound of the Present Invention 2
With respect to compound (YIS-540) having a PEG chain bound to a side chain of YIR-821 via a —C(=O)O— group obtained in Example 6, the PEG chain released in vitro was measured in the same manner as in Example 7.
As a result, the following decomposition reaction was observed in PBS of pH7.4 at 37° C. The results are shown in FIG. 4.
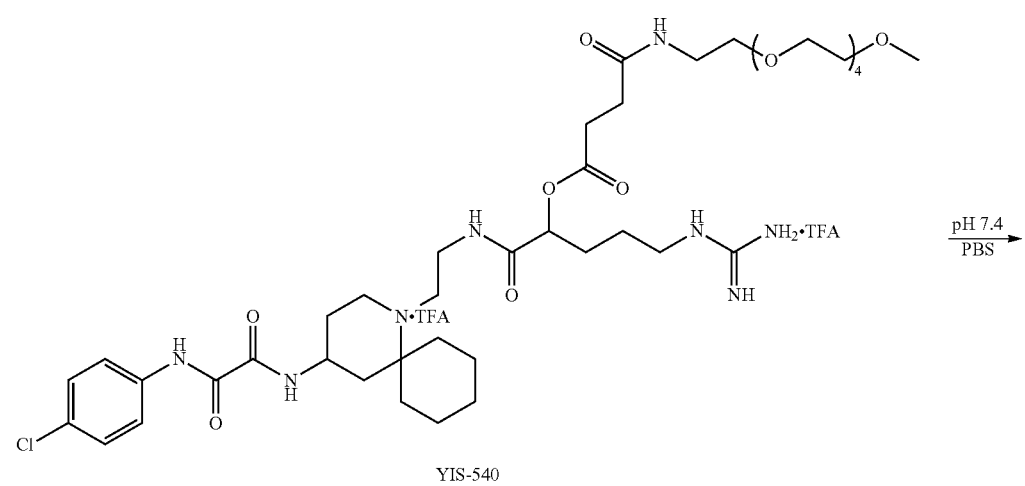

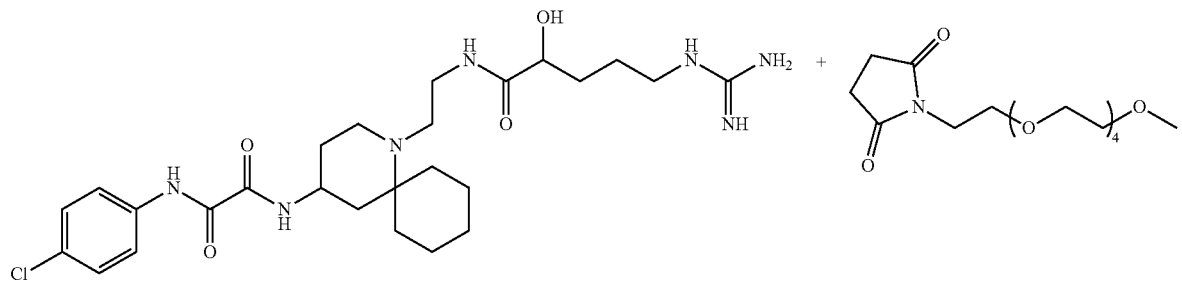

Example 9: Activity Evaluation 1

Each of TKB-001, TKB-002 and TKB-003 synthesized in Examples 1 to 3 was used in combination with an antiviral drug, i.e., efavirenz (EFV), NBD-556, and YIR-821, and cytotoxicity and anti-HIV activity were evaluated. In this Example, TZM-bl cells (available from NIH AIDS Reagent Program (https://www.aidsreagent.org/Index.cfm)) were used for individual evaluations. TZM-bl cells have CD4/CCR5/CXCR4 on the surface and express luciferase when infected with HIV. In this manner, TZM-bl cells serve as indicator cells. In the cells, β-galactosidase gene linked to HIV-1 LTR sequence is integrated. When the cells are infected with HIV-1, the tat gene of HIV-1 expresses a transcriptional activator Tat, which acts on the promoter region of LTR to express β-galactosidase. When a substrate is added, enzymatic cleavage occurs to produce galactose and luciferin. Luciferin is oxidized by luciferase to generate chemiluminescence, which can be detected by a luminometer to determine the number of cells infected with HIV-1.

1) $CC_{50}$ (Calculation of Cytotoxicity)

After each compound was serially diluted, TZM-bl cells ($1\times10^4$) were added, cultured for 48 hours and collected. A Luc reporter reagent was added and the amount of luminescence (reagent: CTG) was measured to calculate $CC_{50}$ value.

2) $IC_{50}$ (Calculation of Anti-HIV Activity)

After each compound was serially diluted, TZM-bl cells ($1\times10^4$) and $100TCID_{50}$ of HIV isolate (KP5mvcR) were added, and then, cultured for 48 hours. Thereafter, the cells were collected and a Luc reporter reagent was added. The amount of luminescence was measured to calculate the inhibition rate of infection ($IC_{50}$). The HIV isolate (KP5mvcR) is an MVC resistant HIV clone, which was obtained by subjecting a clinical isolate KP-5 (YTA) to passage culture with PM1 CCR5 cells in the presence of MVC over 48 passages to obtain MVC resistant KP-5Env, which was inserted into NL43 vector (Yoshimura K, et al., J. Gen. Virol., 95, 1816-1826, 2014).

The results ($CC_{50}$, $IC_{50}$, and SI (selectivity index)) of individual compounds are shown in the following Table 1.

TABLE 1

| Compound | $CC_{50}$ (μM) | $IC_{50}$ (μM) KP-5mvcR | SI |
|---|---|---|---|
| EFV | 28 ± 3.4 | 0.0041 ± 0.00099 | 6,829 |
| NBD-556 | 177 ± 9.5 | 0.27 ± 0.052 | 656 |
| YIR-821 | 45 ± 9.1 | 0.38 ± 0.17 | 118 |
| TKB-001 | >100 | 0.13 ± 0.026 | >769 |
| TKB-002 | >100 | <0.1 (50%) | >1,000 |
| TKB-003 | 40 ± 14 | <0.1 (65%) | >400 |

As is apparent from the results of Table 1, the compounds of the present invention, TKB-001, TKB-002, and TKB-003, have low cytotoxicity and high anti-HIV activity, demonstrating the efficacy comparable to existing antiviral drugs. From the results of SI, it was suggested that TKB-002 has particularly high safety and sufficient effect.

Example 10: Activity Evaluation 2

YIS-527 and YIS-540 synthesized in Examples 5 and 6 were subjected to evaluation for cytotoxicity and anti-HIV activity in the same manner as in Example 9.

Table 2 shows the results of activity evaluation of YIS-527 and YIS-540 together with those of a control compound, YIR-821.

TABLE 2

| Compound | $CC_{50}$ (μM) | $IC_{50}$ (μM) KP-5mvcR | SI |
|---|---|---|---|
| YIR-821 | 45 ± 9.1 | 0.38 ± 0.17 | 118 |
| YIS-527 | 17 ± 0.22 | 1.2 ± 0.11 | 14 |
| YIS-540 | 109 ± 8.2 | 0.017 ± 0.011 | 6412 |

As is apparent from the results of Table 2, it was demonstrated that the compounds of the present invention, YIS-527 and YIS-540, both have low cytotoxicity and high anti-HIV activity similarly as YIR-821.

Example 11: Stability Evaluation

TKB-002 synthesized in Example 2 was evaluated for biological stability.

More specifically, TKB-002 trifluoroacetate was dissolved in a 100 mM sodium phosphate buffer (NaPB, pH 7.4) to obtain a 0.3 mM solution. This solution (183 μL) was mixed with 20 mM NADPH (2 μL) in 100 mM NaPB (pH 7.4), and 5 μL of 20 mg/mL human liver microsome (Human Microsomes, 50 Donors (ThermoFisher Scientific, cat #: HMMCPL, Lot #: PL050E-A)) solution. After the mixture was pre-incubated at 37° C. for 5 minutes, 20 mM NADPH solution (10 μL) was added to the mixture, which was incubated while gently stirring for 60 minutes at 37° C.

Subsequently, 200 μL of ethyl acetate was added to the mixture to terminate the reaction. The mixture was stirred by a vortex mixer and centrifuged at 3,000 rpm for 5 minutes. The supernatant was filtered and ethyl acetate was removed with nitrogen gas.

To the mixture, 50 μL of MeCN containing 0.1% TFA was added and analysis was carried out by HPLC in the same conditions as in Reference Example 1 and Example 4.

As a result, TKB-002 was detected as a single peak at a retention time of about 20 minutes in the HPLC conditions used herein. Even after incubation with human liver microsomes for 60 minutes, the intensity of the peak was the same as before incubation, showing that TKB-002 is extremely stable in the presence of human liver microsomes.

INDUSTRIAL APPLICABILITY

The present invention can provide a CD4 mimic compound having an anti-HIV activity equivalent to or higher than those of antiviral drugs previously reported and CD4 mimic compounds previously developed by the present inventors, and simultaneously having low cytotoxicity and a long half-life in vitro and in vivo. Accordingly, the CD4 mimic compound is expected to maintain its action for a longer period of time, with the result that the cost of therapy can be reduced.

All publications, patents and patent applications cited in the specification are incorporated herein in their entireties by reference.

The invention claimed is:

1. A compound represented by the formula (I):

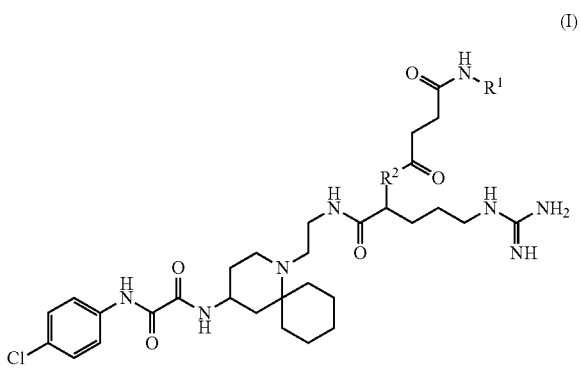

wherein $R^1$ is $C_2H_4(OC_2H_4)_n$—$OCH_3$ or $C_mH_{2m+1}$; $R^2$ is O or NH; n is 3 to 25; and m is 4 to 22, or a salt thereof.

2. The compound or a salt thereof according to claim 1, represented by the formula:

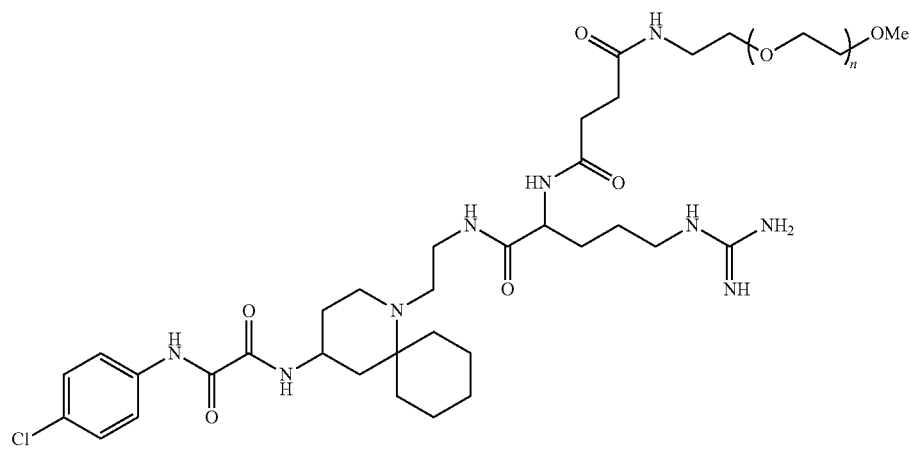

wherein n is 3 to 25.

3. The compound or a salt thereof according to claim 2, wherein n is 4 to 23.

4. An HIV infection inhibitor composition comprising a compound or a salt thereof according to claim 1.

5. A method for treating HIV infection, comprising administering a composition of claim 4 to a patient in need thereof.

6. The method according to claim 5, wherein the HIV infection inhibitor is administered in combination with an anti-HIV antibody.

7. The method according to claim 6, wherein the anti-HIV antibody is a neutralizing antibody specific to V3 loop on a surface of HIV-1.

8. A method for treating HIV infection, comprising administering a compound or a salt thereof of claim 1 to a patient in need thereof.

9. The method of claim 8, further comprising administering an anti-HIV antibody with said compound or salt thereof.

10. The method of claim 9, wherein the anti-HIV antibody is a neutralizing antibody specific to V3 loop on a surface of HIV-1.

* * * * *